US009654851B2

(12) United States Patent
Sato et al.

(10) Patent No.: US 9,654,851 B2
(45) Date of Patent: May 16, 2017

(54) OPTICAL CROSS-CONNECT DEVICE

(71) Applicant: JAPAN SCIENCE AND TECHNOLOGY AGENCY, Kawaguchi-shi, Saitama (JP)

(72) Inventors: Ken-ichi Sato, Nagoya (JP); Hiroshi Hasegawa, Nagoya (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 0 days.

(21) Appl. No.: 14/903,379

(22) PCT Filed: Jun. 30, 2014

(86) PCT No.: PCT/JP2014/067452
§ 371 (c)(1),
(2) Date: Jan. 7, 2016

(87) PCT Pub. No.: WO2015/005170
PCT Pub. Date: Jan. 15, 2015

(65) Prior Publication Data
US 2016/0150300 A1  May 26, 2016

(30) Foreign Application Priority Data
Jul. 10, 2013  (JP) .................................. 2013-144936

(51) Int. Cl.
*H04J 14/00* (2006.01)
*H04Q 11/00* (2006.01)

(52) U.S. Cl.
CPC ..... *H04Q 11/0005* (2013.01); *H04Q 11/0003* (2013.01); *H04Q 2011/0007* (2013.01);
(Continued)

(58) Field of Classification Search
CPC .......... H04Q 11/0005; H04Q 11/0003; H04Q 2011/0007; H04Q 2011/0015;
(Continued)

(56) References Cited

U.S. PATENT DOCUMENTS 5,805,320 A * 9/1998 Kuroyanagi ........ H04J 14/0295
398/5
6,606,427 B1 * 8/2003 Graves ................ G02B 6/3849
385/17

(Continued)

FOREIGN PATENT DOCUMENTS

JP    H04-268894 A    9/1992
JP    2006-140598 A   6/2006
(Continued)

OTHER PUBLICATIONS

Large-Scaled Photonic Node Architecture that Utilizes Interconnected Small Scale Optical Cross-Connect Sub-Systems. 2012. Iwai et al.*

(Continued)

*Primary Examiner* — Hibret Woldekidan
(74) *Attorney, Agent, or Firm* — Oliff PLC

(57) ABSTRACT

An optical cross-connect apparatus optical nodes in an optical network, the optical nodes being mutually connected through internode connection optical fibers, the optical cross-connect apparatus having: optical cross-connect portions having internode connection input ports and internode connection output ports respectively connected to the internode connection optical fibers, and internal connection input and output ports, the optical cross-connect portions being connected such that an internal connection output port of a predetermined optical cross-connect portion is directly connected to an internal connection input port of another optical cross-connect portion and is indirectly connected via the another optical cross-connect portion to an internal connec- (Continued)

tion output port of a further optical cross-connect portion, at least one optical cross-connect portion of the optical cross-connect portions including an internal connection input port and an internal connection output port for connecting to an optical cross-connect portion for expansion connected to none of the other optical cross-connect portions.

12 Claims, 18 Drawing Sheets

(52) U.S. Cl.
CPC .............. *H04Q 2011/0015* (2013.01); *H04Q 2011/0016* (2013.01); *H04Q 2011/0052* (2013.01)

(58) Field of Classification Search
CPC ... H04Q 2011/0016; H04Q 2011/0052; H04Q 2011/0024; H04Q 2011/0058; H04J 14/0212; G02B 6/29383; G02B 6/29311; G02B 6/35; G02B 6/3556; G02B 6/4215; H04B 10/27
USPC ............... 398/50, 56, 45, 51, 54, 79, 83, 84
See application file for complete search history.

(56) References Cited

U.S. PATENT DOCUMENTS

| | | | | | |
|---|---|---|---|---|---|
| 7,120,328 | B2 * | 10/2006 | Testa | ..................... | H04L 49/357 385/17 |
| 7,162,632 | B2 * | 1/2007 | Cao | ..................... | H04J 14/0212 713/153 |
| 8,320,759 | B2 * | 11/2012 | Boduch | ............... | H04J 14/0204 398/48 |
| 8,346,089 | B2 * | 1/2013 | Wisseman | .......... | H04J 14/0204 398/83 |
| 8,457,496 | B2 * | 6/2013 | Zami | ................... | H04J 14/0204 398/48 |
| 9,084,033 | B2 * | 7/2015 | Sato | ................... | H04Q 11/0005 |
| 2006/0098981 | A1 * | 5/2006 | Miura | ................. | H04J 14/0209 398/45 |
| 2006/0140625 | A1 * | 6/2006 | Ooi | ...................... | H04B 10/032 398/19 |
| 2010/0014863 | A1 * | 1/2010 | Zami | ................... | H04J 14/0204 398/79 |
| 2014/0029944 | A1 * | 1/2014 | Sato | ................... | H04Q 11/0005 398/50 |
| 2016/0142797 | A1 * | 5/2016 | Sato | ................... | H04J 14/0212 398/50 |

FOREIGN PATENT DOCUMENTS

| JP | 2008-252664 A | 10/2008 |
|---|---|---|
| JP | 2013-085010 A | 5/2013 |

OTHER PUBLICATIONS

Iwai et al., "Large-Capacity Photonic Node Architecture that Utilizes Stacked Small Scale Optical Cross-Connects," Proceedings of the 2012 IEICE General Conference Tsushin 2, Mar. 6, 2012, p. 484.

Jul. 22, 2014 International Search Report issued in International Patent Application No. PCT/JP2014/067452.

* cited by examiner

OPTICAL CROSS-CONNECT DEVICE

TECHNICAL FIELD

The present invention relates to an optical cross-connect apparatus disposed in an optical network and capable of outputting an input wavelength division multiplexing light from a desired output port on the basis of a wave band or a wavelength.

BACKGROUND ART

An optical network is known that transmits wavelength division multiplexing (WDM) light including multiple groups, for example, M groups of wavelengths each acquired by multiplexing (combining) optical signals of a predetermined bit rate on the order of GHz to THz for each of multiple wavelengths respectively corresponding to multiple wavelength channels (wave lengths or light paths) divided by, for example, 100 GHz in a predetermined communication wavelength band, from a predetermined optical node to a plurality of other optical nodes through multiple optical input fibers (e.g., m fibers) and multiple optical output fibers (e.g., n fibers) (the number of fibers may be or may not be constant between optical nodes) in parallel among the optical nodes. The number of the optical input fibers, for example, m, includes the number of optical fibers from a plurality of optical nodes, and the number of the optical output fibers, for example, n, includes the number of optical fibers to a plurality of optical nodes. In such an optical network, an optical cross-connect apparatus making up each optical node performs routing of wavelength division multiplexing optical signals transmitted through optical fibers directly in the form of optical signals on the basis of a wavelength, thereby implementing large-capacity transmission with low power consumption. For example, this corresponds to an optical cross-connect apparatus described in Patent Document 1.

Because a traffic amount is predicted to increase at an accelerated rate in the optical network due to the recent spread of ADSL and FTTH and the spread of services such as high-definition moving image distribution, it is desired to increase the numbers of wavelength paths and optical fibers, i.e., to further increase the scale of the optical cross-connect apparatuses making up the optical nodes.

PRIOR ART DOCUMENT

Patent Document

Patent Document 1: Japanese Laid-Open Patent Publication No. 2008-252664

SUMMARY OF THE INVENTION

Problem to be Solved by the Invention

Although, for example, a conventional optical cross-connect apparatus described in Patent Document 1 has a configuration using a wavelength selective switch (WSS), the scale thereof is limited to at most about 1*20, which makes it difficult to configure a large-scale optical cross-connect apparatus. In particular, when the wavelength selective switch (WSS) used in the optical cross-connect apparatus is functioned as, for example, a demultiplexer (wave separator), the switch employs a configuration in which a wavelength is selected from a wavelength division multiplexing light by a diffraction grating dispersing the light output from one of end surfaces of a plurality of optical fibers, a condensing lens condensing the light dispersed by the diffraction grating onto MEMS mirrors of the same number as the demultiplexed (split) wavelengths, and a three-dimensionally configured spatial optical system making the light selectively reflected by the MEMS mirrors incident on one of end surfaces of a plurality of optical fibers through the condensing lens and the diffraction grating and, therefore, because an increase in the number of output ports not only makes the wavelength selective switch expensive due to the necessity of high-precision processing but also increases an optical loss, the maximum number of the ports is limited to at most about 20 without considering the price in existing wavelength selective switches, and it is practically difficult to implement a larger scale of the optical cross-connect apparatus. Although 1*9 wavelength selective switches are widely used in reality, even the wavelength selective switches of this scale cost about one million yen each.

When the optical cross-connect apparatus is increased in the number of optical fibers connected to the optical cross-connect apparatus (optical node) in association with the spread of distribution service for high-definition moving images etc., this is difficult to implement in terms of cost and techniques because of the above situations and cannot easily be dealt with.

The present invention was conceived in view of the situations and it is therefore an object of the present invention to provide an optical cross-connect apparatus having a path switching function and a significantly small scale of hardware in an optical node in an optical network and capable of easily dealing with an increase in the number of optical fibers connected to the optical cross-connect apparatus (optical node) due to an increase in traffic.

Means for Solving the Problem

To achieve the above object, the principle of the present invention provides an optical cross-connect apparatus (a) disposed in each of optical nodes in an optical network in which the optical nodes are each mutually connected through a plurality of internode connection optical fibers, the optical cross-connect apparatus comprising: (b) multiple optical cross-connect portions each having internode connection input ports and internode connection output ports respectively connected to the plurality of internode connection optical fibers, as well as internal connection input ports and internal connection output ports, (c) the multiple optical cross-connect portions each being connected such that an internal connection output port of a predetermined optical cross-connect portion is directly connected to an internal connection input port of another optical cross-connect portion and is indirectly connected via said another optical cross-connect portion to an internal connection output port of a further optical cross-connect portion, (d) at least one optical cross-connect portion of the multiple optical cross-connect portions including an internal connection input port and an internal connection output port for connecting to an optical cross-connect portion for expansion connected to none of the other optical cross-connect portions.

Effects of the Invention

The optical cross-connect apparatus of the present invention constructed as described above includes the multiple optical cross-connect portions (sub-systems) each having the internode connection input ports and the internode connection output ports respectively connected to pluralities of the internode connection optical fibers, as well as the internal connection input ports and the internal connection output ports, and each of the multiple optical cross-connect portions is connected such that an internal connection output port of a predetermined optical cross-connect portion is directly connected to an internal connection input port of another optical cross-connect portion and is indirectly connected via said another optical cross-connect portion to an internal connection input port of a further optical cross-connect portion. This enables the routing of wavelength caused to go and return among the optical cross-connect portions and, therefore, as compared to a conventional optical cross-connect apparatus having the same number of fibers, the scale of hardware such as the optical cross-connect portions or the wavelength selective switches can significantly be reduced while a blocking rate or a path accommodation capacity is maintained at the same level.

At the same time, at least one optical cross-connect portion of the multiple optical cross-connect portions includes the internal connection input port, and the internal connection output port for connecting to an optical cross-connect portion for expansion connected to none of the other optical cross-connect portions and, therefore, by connecting an internal connection output port and an internal connection input port of an optical cross-connect portion for expansion respectively to the internal connection input port and the internal connection output port for expansion, a new optical cross-connect portion can inexpensively and easily be added in accordance with an increase in optical fibers connected to an optical node.

In one preferred form of the invention, in a pair of optical cross-connect portions adjacent to each other among the multiple optical cross-connect portions, an internal connection output port of one optical cross-connect portion is connected to an internal connection input port of the other optical cross-connect portion while an internal connection output port of the other optical cross-connect portion is connected to an internal connection input port of the one optical cross-connect portion. As a result, each of the multiple optical cross-connect portions is connected such that an internal connection output port of a predetermined optical cross-connect portion is directly connected to an internal connection input port of another optical cross-connect portion or that an internal connection output port of a predetermined optical cross-connect portion is directly connected to an internal connection input port of another optical cross-connect portion and is indirectly connected via said another optical cross-connect portion to an internal connection input port of a further optical cross-connect portion and, therefore, as compared to a conventional optical cross-connect apparatus having a path accommodation capacity at the same level, the scale of hardware such as the optical cross-connect portions or the wavelength selective switches can significantly be reduced.

In another preferred form of the invention, an internal connection output port of a predetermined optical cross-connect portion of the multiple optical cross-connect portions is directly connected to an internal connection input port of another optical cross-connect portion and is indirectly connected via said another optical cross-connect portion to an internal connection input port of a further optical cross-connect portion so that the optical cross-connect portions are arranged and connected like a chain through internal connection optical fibers. As a result, a wavelength output from an internal connection output port of a predetermined optical cross-connect portion can be transmitted in one direction to one of the optical cross-connect portions adjacent to each other among the optical cross-connect portions connected like a chain.

In a further preferred form of the invention, the optical cross-connect apparatus comprises at least three optical cross-connect portions and wherein each of the at least three optical cross-connect portions is connected such that an internal connection output port of a predetermined optical cross-connect portion is directly connected to an internal connection input port of another optical cross-connect portion and that the optical cross-connect portions are arranged and connected like a ring through internal connection optical fibers. As a result, a wavelength output from an internal connection output port of a predetermined optical cross-connect portion can bi-directionally be transmitted to a pair of optical cross-connect portions adjacent to each other among the optical cross-connect portions connected like a ring.

In another preferred form of the invention, the multiple optical cross-connect portions are each made up of a wavelength selective switch including a spectral element dispersing a wavelength division multiplexing light into each wavelength and a MEMS mirror or a high-definition reflective liquid crystal panel (Liquid Crystal on Silicon) receiving and alternatively inputting a wavelength dispersed by the spectral element to any one of multiple fibers, and for example, a multiplexer disposed for respective optical output fibers to receive and multiplex the wavelengths having paths switched by the wavelength selective switch and output the wavelengths to the optical output fibers. This advantageously reduces the number of elements and makes the scale relatively small as compared to an optical cross-connect portion made up of demultiplexers disposed for respective optical input fibers to demultiplex respective wavelength division multiplexing lights into each wavelength, 1*n-optical switches as many as the wavelengths for switching a path of each wavelength demultiplexed by the demultiplexer, and 1*n-multiplexers disposed for respective optical output fibers to receive and multiplex the wavelengths having paths switched by the 1*n-optical switches and output the wavelengths to the optical output fibers.

In a further preferred form of the invention, the multiple optical cross-connect portions each include a plurality of photocouplers respectively connected to the internode connection input ports and the internal connection input ports, and output-side wavelength selective switches respectively connected to the internode connection output ports and the internal connection output ports to receive wavelength division multiplexing lights from the photocouplers and select and alternatively output wavelengths included in the wavelength division multiplexing lights to the internode connection output ports and the internal connection output ports. In another preferred form of the invention, the multiple optical cross-connect portions each include a plurality of input-side wavelength selective switches respectively connected to the internode connection input ports and the internal connection input ports and receiving input wavelength division multiplexing lights to select wavelengths included in the wavelength division multiplexing lights, and photocouplers respectively connected to the internode connection output ports and the internal connection output ports and receiving and outputting the wavelengths selected by the input-side wavelength selective switches respectively to the internode connection output ports and the internal connection output ports. In this way, the number of the wavelength selective switches can be reduced by half as compared to a case that the wavelength selective switches are used for both the input and output ports.

In a further preferred form of the invention, the multiple optical cross-connect portions each have a plurality of input-side wavelength selective switches respectively connected to the internode connection input ports and the internal connection input ports, and output-side wavelength selective switches respectively connected to the internode connection output ports and the internal connection output ports to receive and alternatively output wavelengths selected by the input-side wavelength selective switches to the internode connection output ports and the internal connection output ports. In this way, because photocouplers are not employed, the optical loss is significantly reduced in the optical cross-connect portion.

In another preferred form of the invention, an optical cross-connect for expansion (sub-system) added to the optical cross-connect apparatus includes an internal connection input port and an internal connection output port for expansion not connected to the multiple optical cross-connect portions included in the optical cross-connect apparatus. As a result, by connecting the internal connection input port and the internal connection output port for expansion of the optical cross-connect portion for expansion with the internal connection output port and the internal connection input port of another optical cross-connect portion for expansion, a new optical cross-connect portion can inexpensively and easily be added sequentially in accordance with a further increase in the optical fibers connected to the optical node.

Preferably, the wavelength division multiplexing light is made up of wavelength channels of continuous wavelengths that are sequentially varying wavelengths. This advantageously facilitates design since the wavelength channels of continuous wavelengths can be used. Preferably, the wavelength division multiplexing light is made up of wavelength channels of discontinuous wavelengths. This is advantageous in that a degree of freedom of design can be increased.

Preferably, the wavelength division multiplexing light includes wavelength channels having signal bit rates different from each other. In this way, the versatility of the optical cross-connect apparatus is enhanced.

Preferably, the wavelength division multiplexing light includes wavelength channels of wavelengths having different wavelength intervals. In this way, the versatility of the optical cross-connect apparatus is enhanced.

MODES FOR CARRYING OUT THE INVENTION

Embodiments of the present invention will now be described in detail with reference to the drawings.

First Embodiment

Figure 1:
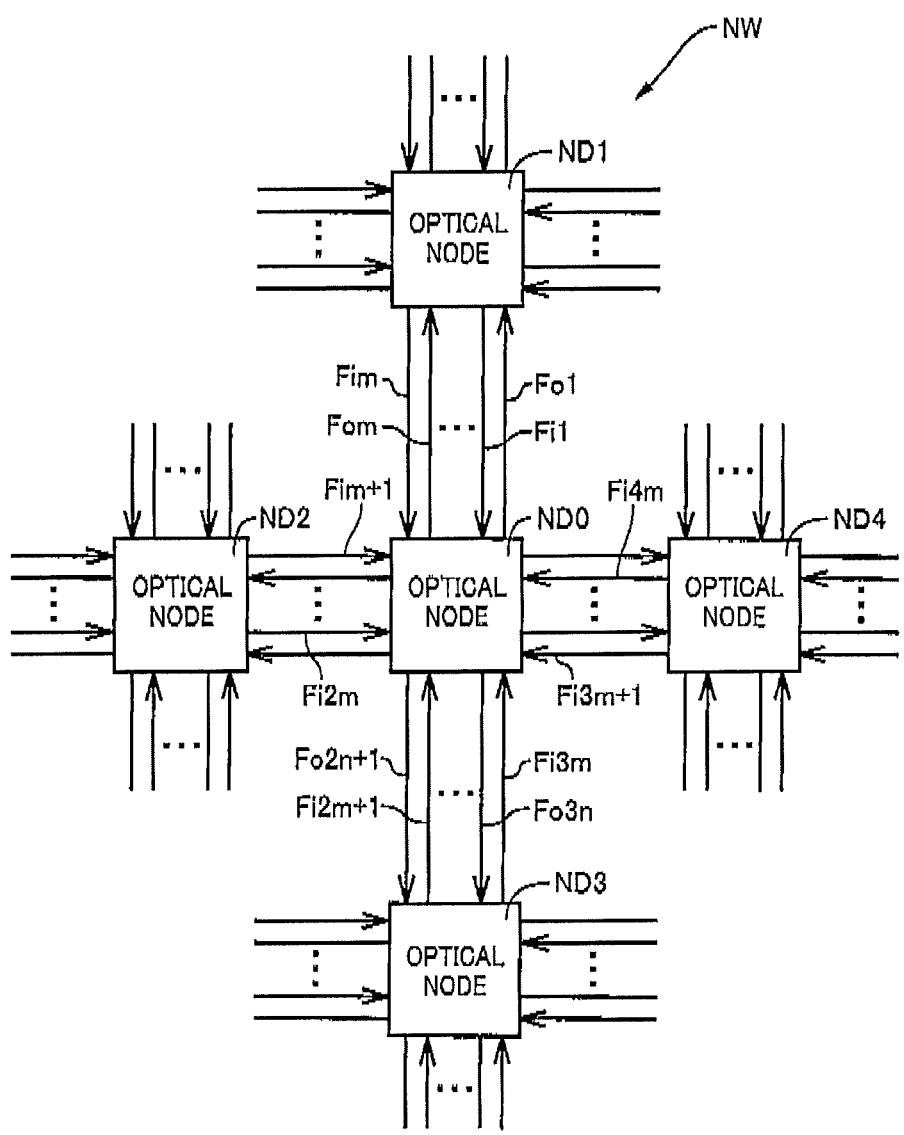
FIG. 1 is a conceptual diagram for explaining an example of an optical network in which optical nodes using optical cross-connect apparatuses of an embodiment of the present invention are connected through optical fibers.

FIG. 1 shows a portion of an optical network NW made up of multiple optical nodes ND0 to NDd and optical fibers connecting the optical nodes. It is noted that d denotes an arbitrary positive integer and, although d is four indicative of the number of optical nodes adjacent to the optical node ND0 in this embodiment, d may be another integer. Since the optical nodes ND0 to ND4 are configured in the same way, the optical node ND0 will hereinafter be described as a representative with reference to FIG. 2.

Figure 2:
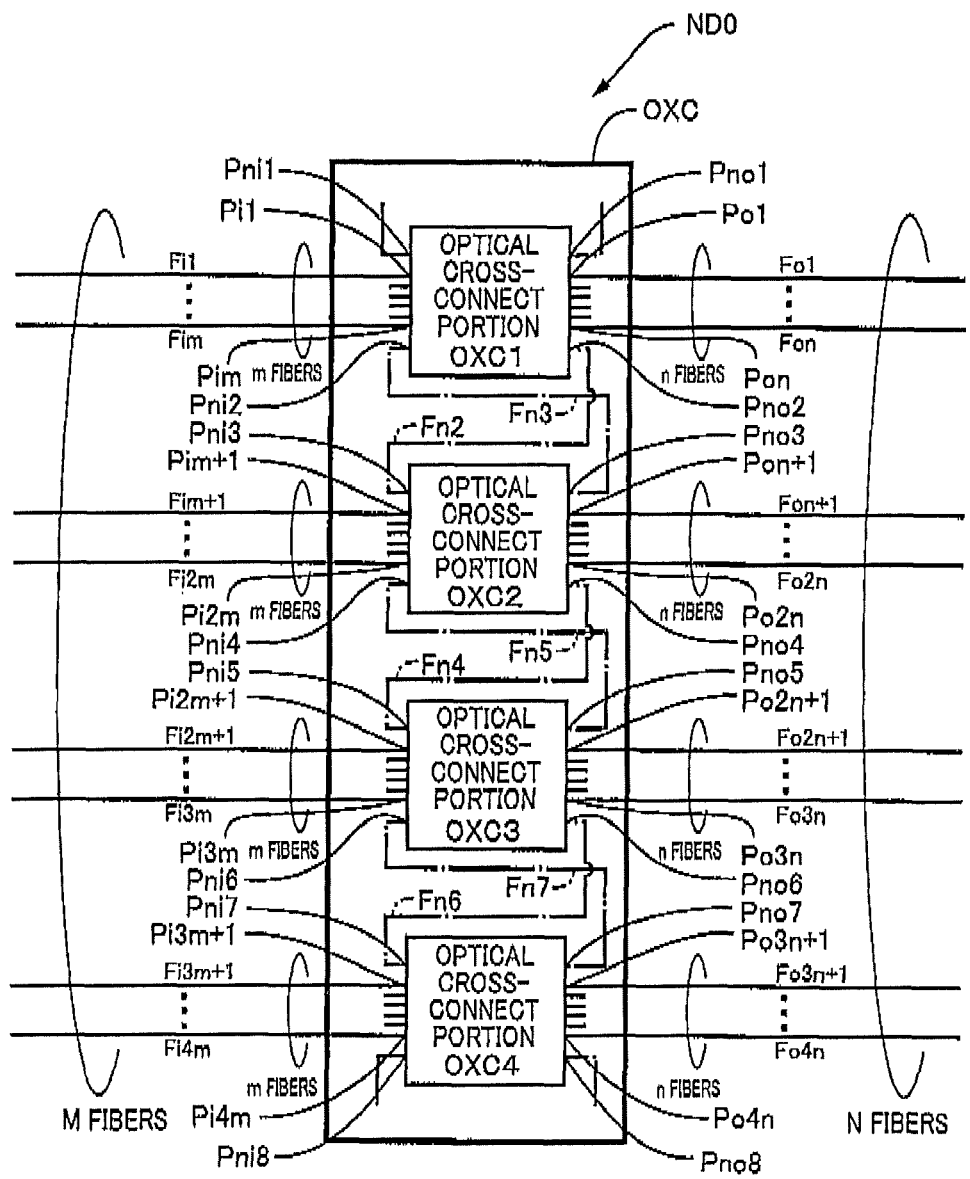
FIG. 2 is a diagram for explaining a configuration of an optical cross-connect apparatus making up an optical node in the optical network of FIG. 1.

As shown in FIG. 2, an optical cross-connect apparatus OXC disposed in the optical node ND0 includes s optical cross-connect portions OXC1 to OXCs acting as sub-systems. Because of s=4 in FIG. 2 with respect to the optical cross-connect portions (sub-systems) OXC1 to OXCs (s is an integer indicative of the number) making up the optical cross-connect apparatus OXC, the optical cross-connect apparatus OXC is made up of four optical cross-connect portions OXC1 to OXC4. Although the number s of the optical cross-connect portions OXC1 to OXCs may not identical to the number d of the optical nodes ND adjacent to the optical node ND0 and can be set independently of the number of the adjacent nodes, the number is identical to the number of the optical nodes ND adjacent to the optical node ND0 in this embodiment. FIG. 2 shows the input/output connection of the optical cross-connect apparatus OXC and the internal connection among the optical cross-connect portions OXC1 to OXC4 in the optical cross-connect apparatus OXC.

The input side of the optical cross-connect apparatus OXC is connected to m optical input fibers from each of the optical nodes ND1 to NDd adjacent to the optical node ND0, i.e., a total of M (=m*d) optical input fibers Fi1 to Fim, Fim+1 to Fi2m, Fi2m+1 to Fi3m, Fi3m+1 to Fi4m. The output side of the optical cross-connect apparatus OXC is connected to n optical output fibers to each of the optical nodes ND1 to NDd adjacent to the optical node ND0, i.e., a total of N(=n*d) optical output fibers Fo1 to Fon, Fon+1 to Fo2n, Fo2n+1 to Fo3n, Fo3n+1 to Fo4n. Wavelength division multiplexing light is transmitted from each of the optical input fibers Fi1 to Fim, Fim+1 to Fi2m, Fi2m+1 to Fi3m, Fi3m+1 to Fi4m and input to the optical cross-connect apparatus OXC. The number of the optical input fibers Fi1 to Fi4m is m*d in total while the number of the optical output fibers Fo1 to Fo4n is n*d in total, and the optical input fibers Fi1 to Fi4m and the optical output fibers Fo1 to Fo4n act as internode connection optical fibers.

The optical cross-connect apparatus OXC performs path-switching (routing) for each of the wave bands or wavelengths included in the wavelength division multiplexing light for output to one of the optical output fibers Fo1 to Fon, Fon+1 to Fo2n, Fo2n+1 to Fo3n, Fo3n+1 to Fo4n.

In this embodiment, each wave band WB may be formed by multiplexing lights of multiple wavelengths, for example, 16 wavelengths, respectively corresponding to multiple wavelength channels (wave channels or light paths) divided by, for example, 100 GHz in a predetermined communication wavelength and one wavelength division multiplexing (WDM) light may be formed by multiplexing the wave bands WB and the wavelength division multiplexing lights may be transmitted through respective optical fibers in parallel. The wavelengths of the wavelength channels included in the wave bands WB of the wavelength division multiplexing light may sequentially continuously increase or may be dispersive. The wavelength division multiplexing light may be consisting of sequentially-arranged wave bands set as multiple wave bands sequentially selected such that each band is made up of 16 wavelengths continuous to each other selected out of continuous wavelength channels. Alternatively, the wavelength division multiplexing light may be consisting of dispersively-arranged wave bands having each wave band set as wavelengths dispersively selected from each of sets of multiple continuous wavelengths. The wave bands may not be utilized. The wavelength channels constituting the wavelength division multiplexing signals may be optical signals having the same bit rate as each other, or may be optical signals having bit rates partially or entirely different from each other. The wavelength channels may not necessarily be at equal intervals and may partially or entirely be wavelength channels at unequal intervals.

Returning to FIG. 2, for external connection, the optical cross-connect portions OXC1 to OXC4 respectively have internode connection input ports Pi1 to Pim, Pim+1 to Pi2m, Pi2m+1 to Pi3m, Pi3m+1 to Pi4m respectively connected to the optical input fibers Fi1 to Fim, Fim+1 to Fi2m, Fi2m+1 to Fi3m, Fi3m+1 to Fi4m and internode connection output ports Po1 to Pon, Pon+1 to Po2n, Po2n+1 to Po3n, Po3n+1 to Po4n respectively connected to the optical output fibers Fo1 to Fon, Fon+1 to Fo2n, Fo2n+1 to Fo3n, Fo3n+1 to Fo4n.

For internal connection, the optical cross-connect portions OXC1 to OXC4 respectively have internal connection input ports Pni1 to Pni2, Pni3 to Pni4, Pni5 to Pni6, Pni7 to Pni8 and internal connection output ports Pno1 to Pno2, Pno3 to Pno4, Pno5 to Pno6, Pno7 to Pno8. The internode connection input ports Pi1 to Pim of the optical cross-connect portion OXC1 may be connected to the optical input fibers Fi1 to Fim from the optical node ND1, or may be connected to any m fibers out of the total of M fibers from the optical nodes ND1 to ND4. Similarly, the internode connection output ports Po1 to Pon of the optical cross-connect portion OXC1 may be connected to the optical output fibers Fo1 to Fon to the optical node ND1, or may be connected to any n fibers out of the total of N fibers to the optical nodes ND1 to ND4. In the optical cross-connect apparatus OXC, as shown in FIG. 2, each of the 4 (d) optical cross-connect portions OXC1 to OXC4 is connected such that an internal connection output port of a predetermined optical cross-connect portion is directly connected to an internal connection input port of another optical cross-connect portion and is indirectly connected via that optical cross-connect portion to an internal connection input port of a further optical cross-connect portion.

In the example of FIG. 2, in the optical cross-connect portion OXC1, the internal connection input port Pni1 and the internal connection output port Pno1 of the optical cross-connect portion OXC1 are internally connected to none of the optical cross-connect portions in preparation for sub-system expansion and act as an internal connection input port and an internal connection output port for expansion. Similarly, in the optical cross-connect portion OXC4, the internal connection input port Pni8 and the internal connection output port Pno8 of the optical cross-connect portion OXC4 are internally connected to none of the optical cross-connect portions in preparation for sub-system expansion and act as an internal connection input port and an internal connection output port for expansion. The internal connection input port and the internal connection output port for expansion can be connected to an optical cross-connect portion for expansion that is the same as an optical cross-connect portion OXC shown in FIG. 3, 5 or 20, for example, so that a path-switching capacity can easily be increased, in accordance with an increase in an optical traffic demand. It is noted that the internal connection input port and the internal connection output port for expansion as described above may be disposed on one or two or more of the optical cross-connect portion OXC1, the optical cross-connect portion OXC2, the optical cross-connect portion OXC3, and the optical cross-connect portion OXC4.

The internal connection output port Pno2 of the optical cross-connect portion OXC1 is directly connected through an internal connection optical fiber Fn2 to the internal connection input port Pni3 of another optical cross-connect portion OXC2 adjacent to the optical cross-connect portion OXC1, and is indirectly connected through said another optical cross-connect portion OXC2 and an internal connection optical fiber Fn4 to the internal connection input port Pni5 of a further optical cross-connect portion OXC3.

The internal connection output port Pno3 of the optical cross-connect portion OXC2 is directly connected through an internal connection optical fiber Fn3 to the internal connection input port Pni2 of another optical cross-connect portion OXC1 adjacent to the optical cross-connect portion OXC2. The internal connection output port Pno4 of the optical cross-connect portion OXC2 is directly connected through an internal connection optical fiber Fn4 to the internal connection input port Pni5 of another optical cross-connect portion OXC3 adjacent to the optical cross-connect portion OXC2, and is indirectly connected through said another optical cross-connect portion OXC3 and an internal connection optical fiber Fn6 to the internal connection input port Pni7 of a further optical cross-connect portion OXC4.

The internal connection output port Pno5 of the optical cross-connect portion OXC3 is directly connected through an internal connection optical fiber Fn5 to the internal connection input port Pni4 of the optical cross-connect portion OXC2 adjacent to the optical cross-connect portion OXC3, and is indirectly connected through the other optical cross-connect portion OXC2 and an internal connection optical fiber Fn3 to the internal connection input port Pni2 of a further optical cross-connect portion OXC1. The internal connection output port Pno6 of the optical cross-connect portion OXC3 is directly connected through an internal connection optical fiber Fn6 to the internal connection input port Pni7 of another optical cross-connect portion OXC4 adjacent to the optical cross-connect portion OXC3.

In this embodiment, as a result of the connection method described above, the four optical cross-connect portions OXC1 to OXC4 are interconnected like a straight chain. At least two or more portions can be interconnected in the same way. As shown in FIG. 2, in any pair of optical cross-connect portions adjacent to each other out of the four optical cross-connect portions OXC1 to OXC4, an internal connection output port of one optical cross-connect portion is connected to an internal connection input port of the other optical cross-connect portion and an internal connection output port of the other optical cross-connect portion is connected to an internal connection input port of the one optical cross-connect portion. For example, in a pair of the optical cross-connect portion OXC1 and the optical cross-connect portion OXC2, the internal connection output port Pno2 of the one optical cross-connect portion OXC1 is connected through the internal connection optical fiber Fn2 to the internal connection input port Pni3 of the other optical cross-connect portion OXC2 and the internal connection output port Pno3 of the other optical cross-connect portion OXC2 is connected through the internal connection optical fiber Fn3 to the internal connection input port Pni2 of the one optical cross-connect portion OXC1. In a pair of the optical cross-connect portion OXC2 and the optical cross-connect portion OXC3, the internal connection output port Pno4 of the one optical cross-connect portion OXC2 is connected through the internal connection optical fiber Fn4 to the internal connection input port Pni5 of the other optical cross-connect portion OXC3 and the internal connection output port Pno5 of the other optical cross-connect portion OXC3 is connected through the internal connection optical fiber Fn5 to the internal connection input port Pni4 of the one optical cross-connect portion OXC2. In a pair of the optical cross-connect portion OXC3 and the optical cross-connect portion OXC4, the internal connection output port Pno6 of the one optical cross-connect portion OXC3 is connected through the internal connection optical fiber Fn6 to the internal connection input port Pni7 of the other optical cross-connect portion OXC4 and the internal connection output port Pno7 of the other optical cross-connect portion OXC4 is connected through the internal connection optical fiber Fn7 to the internal connection input port Pni6 of the one optical cross-connect portion OXC3.

As described above, in the optical cross-connect apparatus OXC having the optical cross-connect portions OXC1 to OXC4 interconnected through the internal connection optical fibers Fn2 to Fn7, a wavelength output from a predetermined optical cross-connect portion of the optical cross-connect portions OXC1 to OXC4 is input to any other optical cross-connect portions and, therefore, a path can be switched from any one of the optical input fibers Fi1 to Fim, Fim+1 to Fi1m, Fi2m+1 to Fi3m, Fi3m+1 to Fi4m to any of the optical output fibers Fo1 to Fon, Fon+1 to Fo2n, Fo2n+1 to Fo3n, Fo3n+1 to Fo4n. For example, if a path of a predetermined wavelength included in the wavelength division multiplexing light input through the optical input fiber Fi1 to the optical cross-connect portion OXC1 is switched to, for example, the internode connection optical output fiber Fo3n, the predetermined wavelength is first selected in the optical cross-connect portion OXC1 and is output from the internal connection output port Pno2 thereof to the internal connection input port Pni3 of the optical cross-connect portion OXC2. Subsequently, the predetermined wavelength is also selected in the optical cross-connect portion OXC2 and is output from the internal connection output port Pno4 thereof to the internal connection input port Pni5 of the optical cross-connect portion OXC3. The predetermined wavelength is then selected in the optical cross-connect portion OXC3 and is output from the internode connection output port Po3n to the optical output fiber Fo3n. As described above, in the case of using a plurality of the small-scale optical cross-connect portions OXC1 to OXC4 having the input terminals smaller in number as compared to the number of the optical input fibers and the optical output fibers, a predetermined wavelength output from any one of the optical cross-connect portions OXC1 to OXC4 can be input to the other optical cross-connect portions to cause the predetermined wavelength to go and return so that the routing can repeatedly be performed in the optical cross-connect portions to switch the path of the predetermined wavelength.

The optical cross-connect apparatus OXC shown in FIG. 2 is typically provided with an add wavelength selective switch WSS or a photocoupler for sending out an add signal sent at a predetermined wavelength from a router of an electric layer to the wavelength division multiplexing light in a desired optical output fiber to which the add signal is directed out of the 4 n optical output fibers Fo1 to Fo4n, and a drop wavelength selective switch WSS for dropping a drop signal of a predetermined wavelength included in the wavelength division multiplexing light from the 4 m optical input fibers Fi1 to Fi4m to a desired router of the electric layer.

Figure 3:
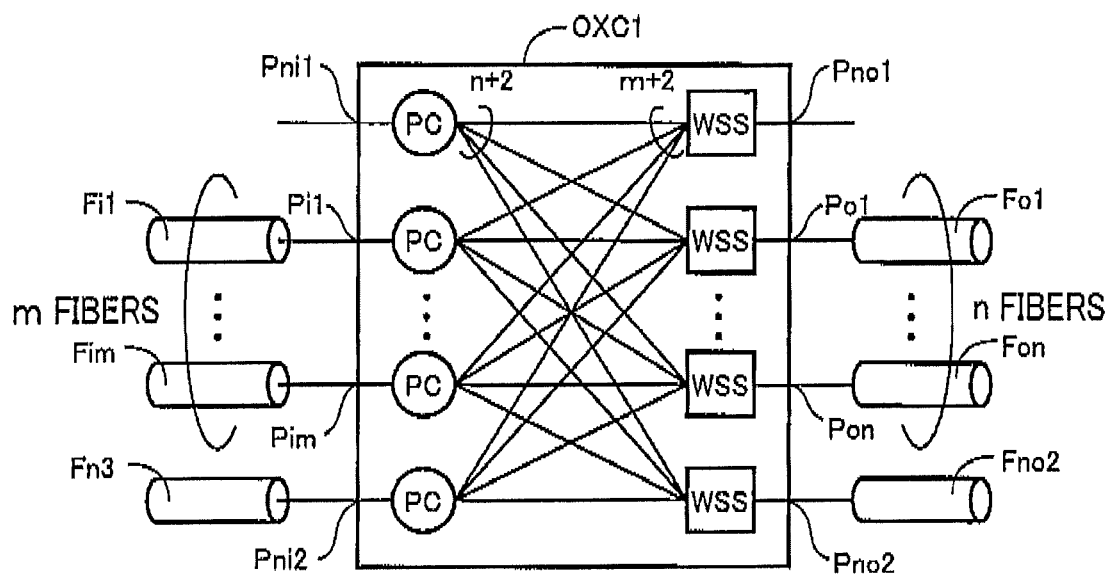
FIG. 3 is a schematic for explaining a configuration of a main portion of an optical cross-connect portion including an internal connection input port and an internal connection output port for expansion used in the optical cross-connect apparatus of FIG. 2.
Figure 4:
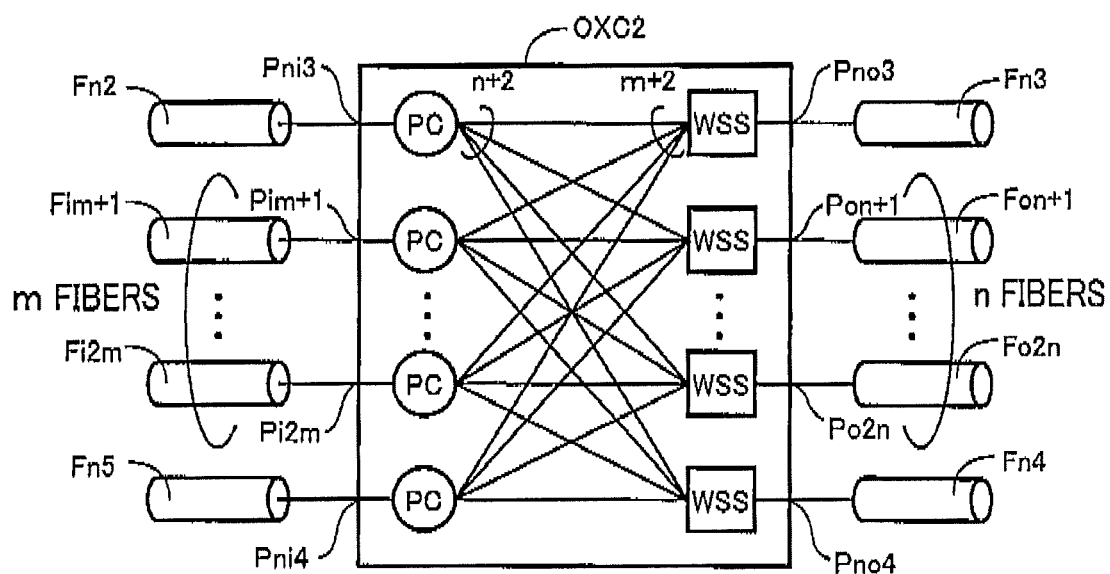
FIG. 4 is a schematic for explaining a configuration of a main portion of an optical cross-connect portion not including an internal connection input port and an internal connection output port for expansion used in the optical cross-connect apparatus of FIG. 2.
Figure 5:
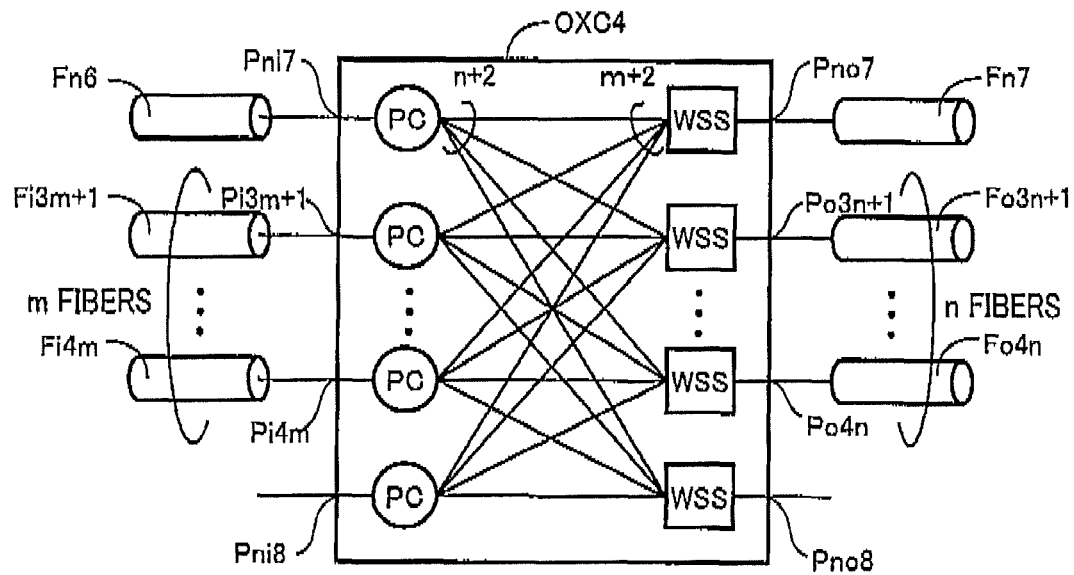
FIG. 5 is a schematic for explaining a configuration of a main portion of an optical cross-connect portion without including an internal connection input port and an internal connection output port for expansion used in the optical cross-connect apparatus of FIG. 2.

Out of the four optical cross-connect portions OXC1 to OXC4 making up the optical cross-connect apparatus OXC, the optical cross-connect portion OXC1 is configured as shown in FIG. 3; the optical cross-connect portion OXC2 is configured as shown in FIG. 4; the optical cross-connect portion OXC3 is configured as shown in FIG. 4 as is the case with the optical cross-connect portion OXC2; and the optical cross-connect portion OXC4 is configured as shown in FIG. 5. The four optical cross-connect portions OXC1 to OXC4 have substantially the same basic configuration in that (m+2) 1*(m+2)-photocouplers PC and (n+2) 1*(n+2)-wavelength selective switches WSS are included.

For the photocouplers PC, for example, branch couplers formed by branching optical fibers or waveguides are used in FIG. 3. The photocouplers PC branch, distribute, and input respective wavelength division multiplexing lights, wave bands, or wavelengths input from the optical input fibers Fi1 to Fim (=Fi4), directly to the (n+2) wavelength selective switches WSS. The wavelength selective switches WSS select and alternatively output predetermined wavelengths from the wavelength division multiplexing lights, wave bands, or wavelengths distributed from the photocouplers PC, to the optical output fibers Fo1 to Fon (=Fo4).

Figure 6:
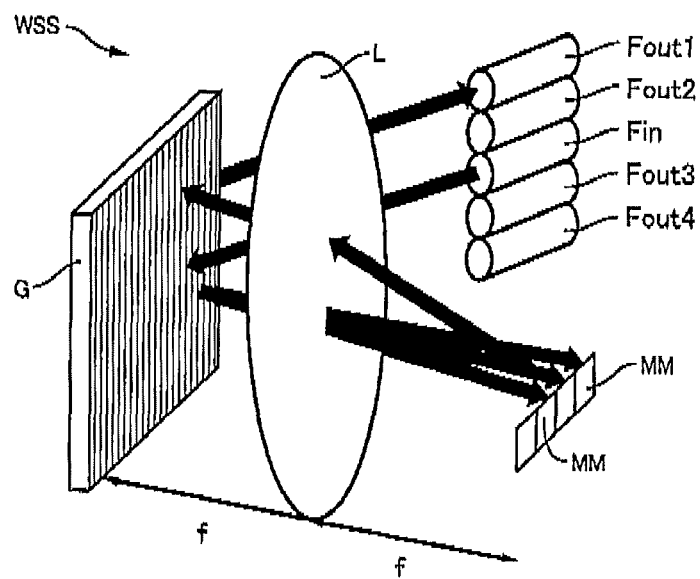
FIG. 6 is a schematic for explaining multiple wavelength selective switches WSS used in the optical cross-connect portions of FIGS. 3 to 5 by using a configuration example using MEMS.
Figure 7:
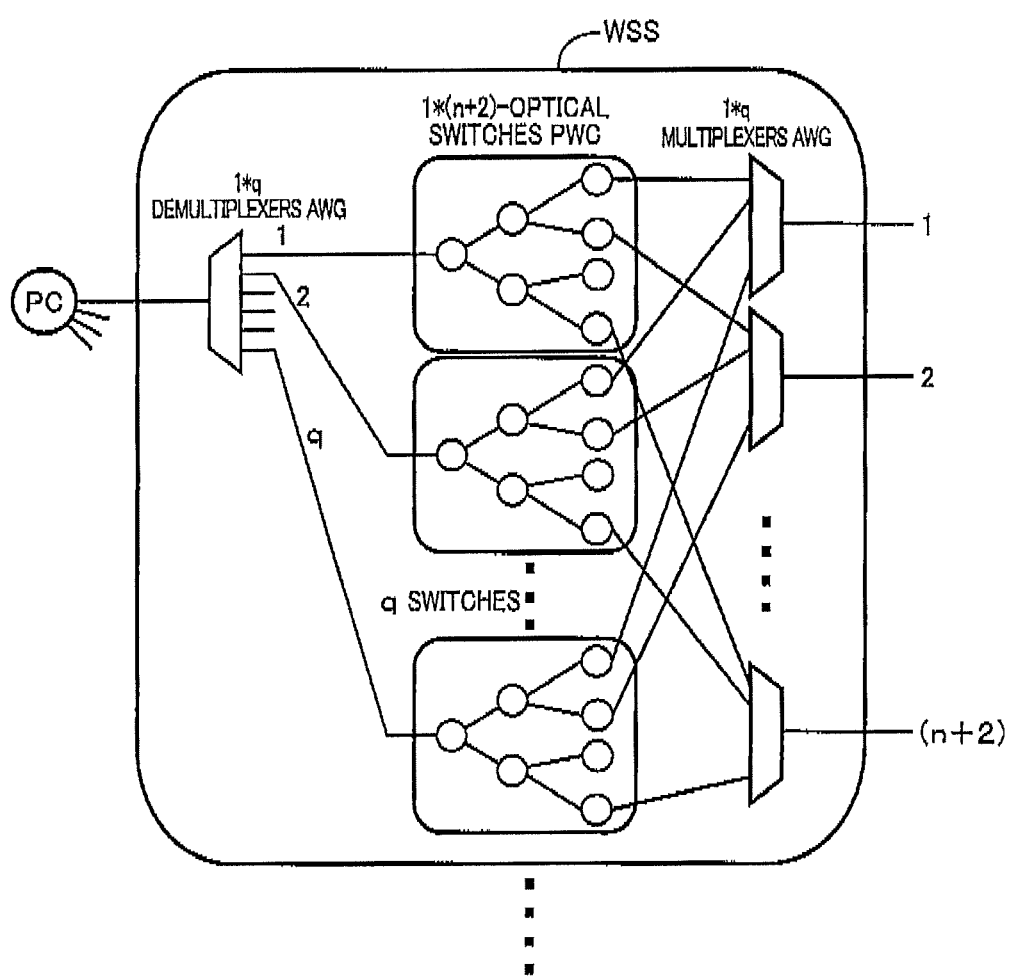
FIG. 7 is a schematic for explaining multiple wavelength selective switches WSS used in the optical cross-connect portions of FIGS. 3 to 5 by using a configuration example using a demultiplexer, optical switches, and multiplexers (wave combiners).

Each of the wavelength selective switches WSS is made up of, for example, a three-dimensional MEMS optical switch shown in a schematic of FIG. 6 or a planer wavelength selective switch shown in FIG. 7. In FIG. 6, a three-dimensional MEMS optical switch is described in 1*4 or 4*1 scale by using one optical input fiber Fin and four optical output fibers Fout1 to Fout4. This three-dimensional MEMS optical switch includes a spectral grating (diffraction grating) G that is a spectral element dispersing the wavelength division multiplexing light input from the optical input fiber Fin on the basis of a wavelength, m (the number of wavelengths, simplified to four in FIG. 6) MEMS mirrors (micromirrors) MM subjected to the position control by an actuator not shown, and a condensing lens L disposed between the spectral grating and the MEMS mirrors to condense a dispersed wavelength onto one of the MEMS mirrors MM, and is driven such that a wavelength division multiplexing light or a wave band input from the optical input fiber Fin is dispersed by the spectral grating G on the basis of a wavelength and is then condensed by the condensing lens L onto the MEMS mirrors MM for respective wavelengths and that a reflected light from the MEMS mirrors MM is incident on a desired one of the optical output fibers Fout1 to Fout4, so as to provide a wavelength selective switch function. Such a three-dimensional MEMS optical switch may practically be configured up to about 1*9 scale.

The wavelength selective switch WSS shown in FIG. 7 may be configured as a planer type by integrating waveguides and elements on a common semiconductor or quartz substrate with a planar lightwave circuit (PLC) technique, for example. This planer type wavelength selective switch WSS may be made up of, for example, one 1*q—(q is the number of wavelengths per fiber) demultiplexer AWG connected to an optical fiber from a photocoupler PC and demultiplexing the wavelength division multiplexing light input therefrom into each wavelength, q 1*(n+2)-optical switches PWC switching a path for each of the wavelengths demultiplexed by the 1*q demultiplexer AWG, and q*1-multiplexers AWG each receiving and multiplexing the output wavelengths from the 1*(n+2)-optical switches PWC for outputting to the N optical output fibers Fout1, Fout2, . . . Fout(n+2) (corresponding to Pno1, Pno2, Fo1 to Fon of FIG. 3).

Figure 8:
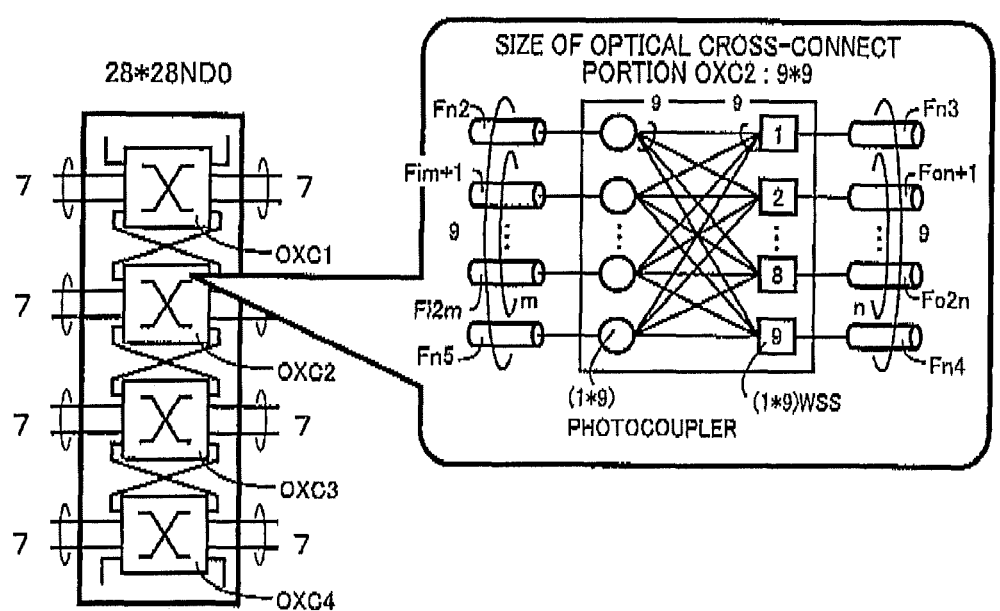
FIG. 8 is a diagram for explaining a configuration scale of the multiple optical cross-connect portions making up the optical cross-connect apparatus of FIG. 2 in comparison with the apparatus consisting of one conventional large-scale optical cross-connect portion shown in FIG. 9.

FIG. 8 shows the optical node ND0 and the optical cross-connect apparatus OXC included therein, and an optical cross-connect portion OXC2 representative of the configuration of optical cross-connect portions OXC1 to OXC4 making up the optical cross-connect apparatus OXC, when the total number of input or output fibers is 28 for each of the optical nodes ND0 to ND4. In this case, because of m=n=7, both the number of the optical input fibers Fim+1 to Fi2m and the number of the optical output fibers Fon+1 to Fo2n are seven and, since the two internal connection optical fibers Fn3 and Fn4 are connected to the input side and the two internal connection optical fibers Fn2 and Fn5 are connected to the output side, the optical cross-connect portion OXC2 has the scale of 9*9. As a result, the optical cross-connect portion OXC2 is made up of nine 1*9-photocouplers PC and nine 1*9-wavelength selective switches WSS. Therefore, the optical cross-connect apparatus OXC is made up of 36 1*9-photocouplers PC and 36 1*9-wavelength selective switches WSS as a whole. Thus, the optical cross-connect apparatus OXC in this embodiment has the number of required 1*9-wavelength selective switches WSS reduced to about ⅓ as compared to a conventional optical cross-connect apparatus OXC consisting of one large-scale wavelength selective switch WSS as shown in FIG. 9.

Figure 9:
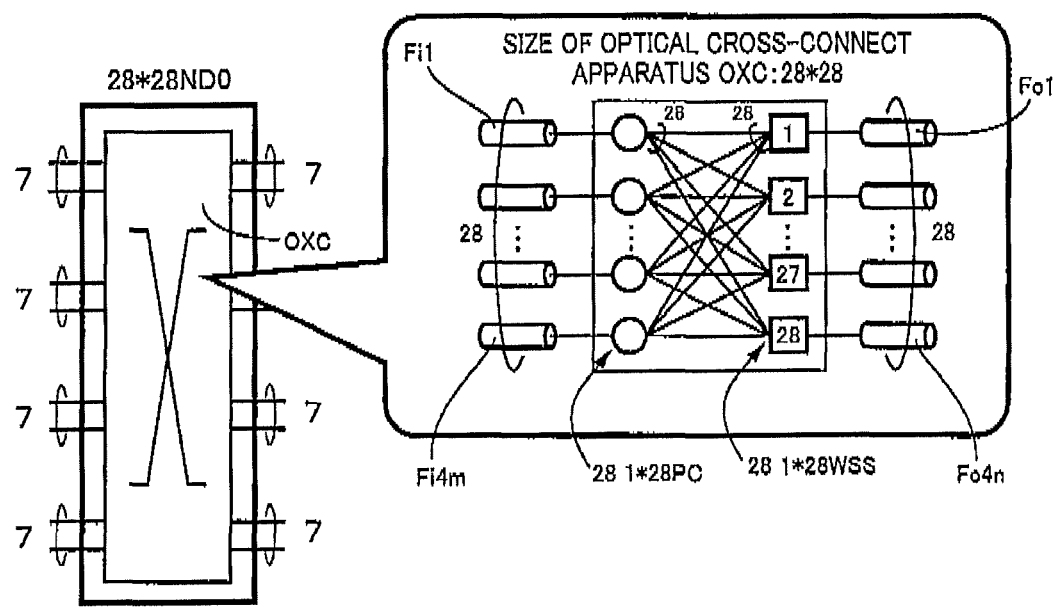
FIG. 9 is a diagram for explaining a configuration of a conventional optical cross-connect apparatus consisting of one large-scale optical cross-connect portion.
Figure 10:
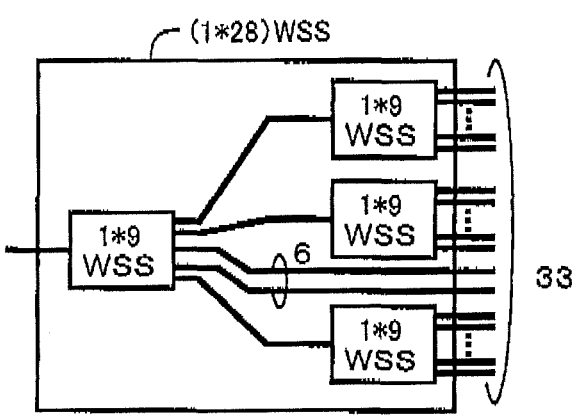
FIG. 10 is a diagram of an example of a configuration using four 1*9-wavelength selective switches WSS when it is assumed that a 1*28-wavelength selective switch WSS is realistically made up of the smallest number of switches for the assumption that the conventional optical cross-connect apparatus shown in FIG. 9 is realistically constructed.

In contrast, in the conventional case that the optical cross-connect apparatus OXC included in the optical node ND0 is made up of a single optical cross-connect portion in the same optical network NW, since no interconnection is made and the scale of the optical cross-connect portion is 28*28 as shown in FIG. 9, the optical cross-connect apparatus OXC is made up of 28 1*28-photocouplers PC and 28 1*28-wavelength selective switches WSS. Since the scale of the 1*28-wavelength selective switches WSS is unrealistic as described above, if it is attempted to achieve a realistic configuration with the number reduced as small as possible, the 1*28-wavelength selective switch WSS is configured by using four 1*9 wavelength selective switches WSS as shown in FIG. 10, for example. Although the scale in this case is 1*33, the wavelength selective switch WSS can be used in the 1*28 scale by using the necessary ports. The optical cross-connect apparatus OXC with such a conventional configuration requires (4*28=112) 1*9-wavelength selective switches WSS.

Figure 11:
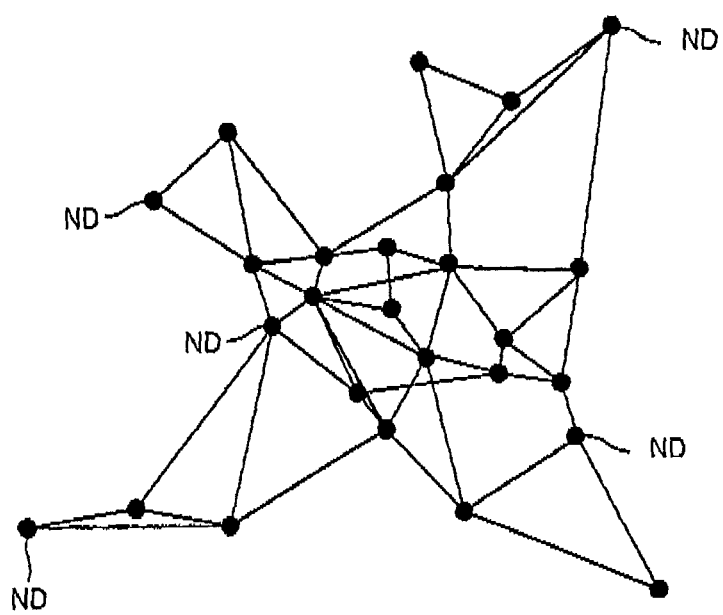
FIG. 11 is a diagram for explaining a configuration of an optical network used in a simulation conducted by the present inventors.
Figure 12:
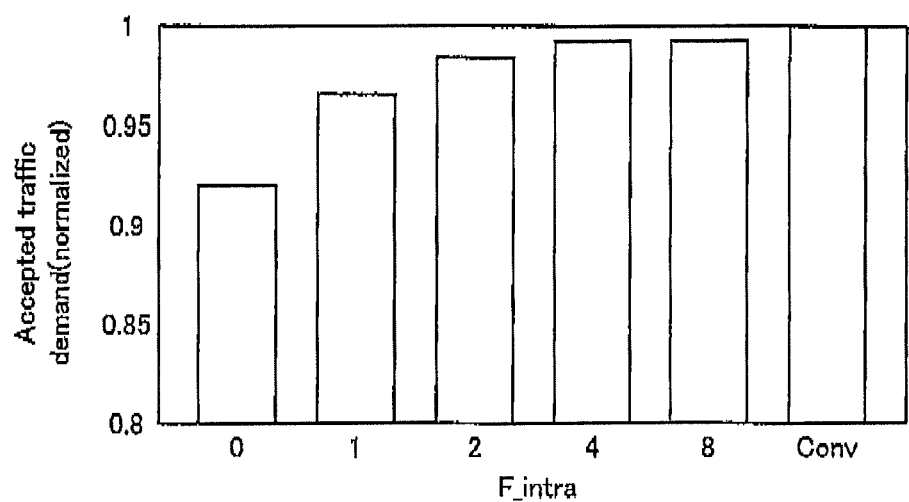
FIG. 12 is a graph of a result of the simulation using the optical network of FIG. 11 for the optical cross-connect apparatus of the present invention made up of multiple optical cross-connect portions with the vertical axis indicative of a normalized traffic accommodation rate acquired by normalization using a traffic accommodation rate of "1" as that of a conventional optical cross-connect apparatus consisting of one large-scale optical cross-connect portion and the horizontal axis indicative of the limit number of optical paths to be passed through between sub-systems.

In the pan-European network connecting optical nodes ND indicated by 26 black circles in FIG. 11, the inventors calculated a normalized traffic accommodation rate (Accepted traffic demand (normalized)) under the following simulation conditions in the case where the optical cross-connect apparatuses OXC of the optical nodes ND are conventional optical cross-connect apparatuses OXC consisting of one large-scale wavelength selective switch WSS as shown in FIG. 9 and in the case where the optical cross-connect apparatus OXC are those in this embodiment (configuration of the present invention) including the multiple optical cross-connect portions interconnected as shown in FIG. 8, for example. FIG. 12 shows the calculation results for the optical cross-connect apparatus OXC of this embodiment including the multiple optical cross-connect portions interconnected as shown in FIG. 8.

(Simulation Conditions)

Topology: pan-European network (the number of nodes: 26)

Multiplexing light per fiber: multiplexing light of 80 wavelengths

Traffic: internode average path demand=14 traffic distribution=uniformly random occurrence of demand=Poisson distribution

FIG. 12 is a graph with the vertical axis indicative of a normalized traffic accommodation rate acquired by normalization using a traffic accommodation rate (Accepted traffic demand) of "1" as that of an optical cross-connect apparatus consisting of one large-scale wavelength selective switch WSS and the horizontal axis indicative of the limit number of optical paths to be passed through between sub-systems (F_intra=0, 1, 2, 4, or 8). As compared to the conventional optical cross-connect apparatus OXC, the optical cross-connect apparatus OXC of this embodiment is reduced in the normalized traffic accommodation rate by less than 1% at F_intra=4, for example. Therefore, the communication performance of the optical cross-connect apparatus OXC of this embodiment is not so much reduced and is almost the same as the conventional optical cross-connect apparatus OXC.

As described above, the optical cross-connect apparatus OXC of this embodiment includes the multiple optical cross-connect portions OXC1 to OXC4 each having the internode connection input ports Pi1 to Pim, Pim+1 to Pi2m, Pi2m+1 to Pi3m, Pi3m+1 to Pi4m and the internode connection output ports Po1 to Pon, Pon+1 to Po2n, Po2n+1 to Po3n, Po3n+1 to Po4n respectively connected to pluralities of the optical input fibers (internode connection optical fibers) Fi1 to Fi4m and the optical output fibers (internode connection optical fibers) Fo1 to Fo4n, as well as the internal connection input ports Pni1 to Pni2, Pni3 to Pni4, Pni5 to Pni6, Pni7 to Pni8 and the internal connection output ports Pno1 to Pno2, Pno3 to Pno4, Pno5 to Pno6, Pno7 to Pno8, and each of the multiple optical cross-connect portions OXC1 to OXC4 is connected such that an internal connection output port of a predetermined optical cross-connect portion is directly connected to an internal connection input port of another optical cross-connect portion and is indirectly connected via said another optical cross-connect portion to an internal connection input port of a further optical cross-connect portion. This enables the routing of wavelength caused to go and return among the multiple optical cross-connect portions OXC1 to OXC4 and, therefore, as compared to a conventional optical cross-connect apparatus having the same blocking rate at the same number of fibers without the multiple interconnected optical cross-connect portions, the scale of hardware such as the optical cross-connect portions or the wavelength selective switches WSS can significantly be reduced while a path accommodation capacity is maintained at the same level.

At the same time, at least one optical cross-connect portion (in this embodiment, the optical cross-connect portions OXC1 and OXC4) of the multiple optical cross-connect portions OXC1 to OXC4 includes the internal connection input port Pni1, the internal connection output port Pno1, the internal connection input port Pni8, and the internal connection output port Pno8 for expansion connected to none of the other optical cross-connect portions and, therefore, by connecting an internal connection output port and an internal connection input port of an optical cross-connect portion for expansion respectively to the internal connection input port and the internal connection output port for expansion, a new optical cross-connect portion can inexpensively and easily be added in accordance with an increase in optical fibers connected to an optical node.

According to the optical cross-connect apparatus OXC of this embodiment, in a pair of optical cross-connect portions adjacent to each other among the multiple optical cross-connect portions OXC1 to OXC4, an internal connection output port of one optical cross-connect portion is connected to an internal connection input port of the other optical cross-connect portion and an internal connection output port of the other optical cross-connect portion is connected to an internal connection input port of the one optical cross-connect portion. As a result, each of the multiple optical cross-connect portions is connected such that an internal connection output port of a predetermined optical cross-connect portion is directly connected to an internal connection input port of another optical cross-connect portion or that an internal connection output port of a predetermined optical cross-connect portion is directly connected to an internal connection input port of another optical cross-connect portion and is indirectly connected via said another optical cross-connect portion to an internal connection input port of a further optical cross-connect portion and, therefore, as compared to a conventional optical cross-connect apparatus having a path accommodation capacity at the same level, the scale of hardware such as the optical cross-connect portions or the wavelength selective switches can significantly be reduced. Additionally, since a wavelength can be transmitted from a predetermined optical cross-connect portion bi-directionally to a pair of one and the other optical cross-connect portions adjacent thereto in the optical cross-connect apparatus OXC, the optical cross-connect apparatus OXC is advantageous in that a path switching process time can be shortened as compared to the case of transmitting a wavelength in one direction.

According to the optical cross-connect apparatus OXC of this embodiment, an internal connection output port of a predetermined optical cross-connect portion of the multiple optical cross-connect portions is directly connected to an internal connection input port of another optical cross-connect portion and is indirectly connected via said another optical cross-connect portion to an internal connection input port of a further optical cross-connect portion so that the optical cross-connect portions are arranged and connected like a chain through internal connection optical fibers. As a result, a wavelength output from an internal connection output port of a predetermined optical cross-connect portion can be transmitted in one direction to one of the optical cross-connect portions adjacent to each other among the optical cross-connect portions connected like a chain.

According to the optical cross-connect apparatus OXC of this embodiment, the multiple optical cross-connect portions OXC1 to OXC4 are each made up of a three-dimensional MEMS optical switch including a spectral grating G that is a spectral element dispersing the wavelength division multiplexing light input from the optical input fiber Fin on the basis of a wavelength, m (the number of wavelengths, simplified to four in FIG. 6) MEMS mirrors MM subjected to the position control by an actuator not shown, and a condensing lens L disposed between the spectral grating and the MEMS mirrors to condense a dispersed wavelength onto one of the MEMS mirrors MM, and the three-dimensional MEMS optical switch is driven such that a wavelength division multiplexing light or a wave band input from the optical input fiber Fin is dispersed by the spectral grating G on the basis of a wavelength and is then condensed by the condensing lens L onto the MEMS mirrors MM for respective wavelengths and that a reflected light from the MEMS mirrors MM is incident on a desired one of the optical output fibers Fout1 to Fout4, so as to provide a wavelength selective switch function. This advantageously reduces the number of elements and makes the scale relatively small as compared to an optical cross-connect portion made up of demultiplexers disposed for respective optical input fibers to demultiplex respective wavelength division multiplexing lights into each wavelength, 1*n-optical switches as many as the wavelengths for switching a path of each wavelength demultiplexed by the demultiplexer, and 1*n-multiplexers disposed for respective optical output fibers to receive and multiplex the wavelengths having paths switched by the 1*n-optical switches and output the wavelengths to the optical output fibers.

According to the optical cross-connect apparatus OXC of this embodiment, as shown in FIGS. 3 to 5, the multiple optical cross-connect portions OXC1 to OXC4 each have the multiple photocouplers PC respectively connected to the internode connection input ports and the internal connection input ports, and the output-side wavelength selective switches WSS respectively connected to the internode connection output ports and the internal connection output ports to receive the wavelength division multiplexing lights from the photocouplers and select and alternatively output wavelengths included in the wavelength division multiplexing lights to the internode connection output ports and the internal connection output ports. In this way, the number of the wavelength selective switches can be reduced by half.

The optical cross-connect apparatus OXC of this embodiment is made up of the two or more optical cross-connect portions. In FIG. 2, the optical cross-connect apparatus OXC is made up of the four optical cross-connect portions OXC1 to OXC4 and the optical cross-connect portions OXC1 to OXC4 are connected like a chain through the internal connection optical fibers Fn2 to Fn7. Therefore, a wavelength output from an internal connection output port of a predetermined optical cross-connect portion can be transmitted to in one direction to one of a pair of adjacent optical cross-connect portions among the optical cross-connect portions connected like a chain.

Second Embodiment

Figure 13:
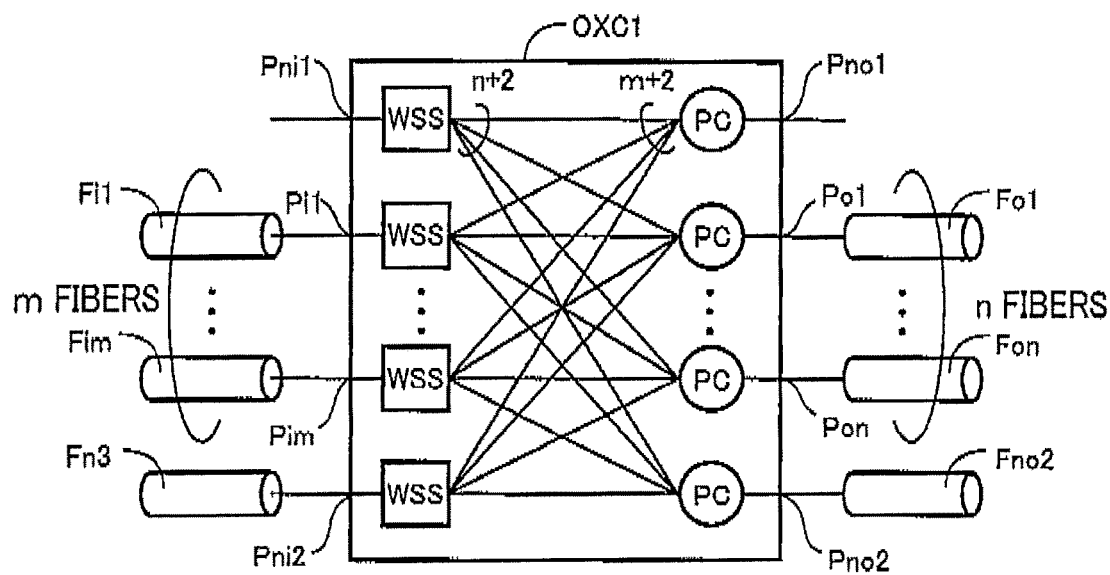
FIG. 13 is a diagram for explaining another configuration example of the multiple optical cross-connect portions provided with the optical cross-connect apparatus, corresponding to FIG. 3.

FIG. 13 shows another example of the optical cross-connect portion OXC1 shown in FIG. 3. This optical cross-connect portion OXC1 of a second embodiment has multiple (m+2) 1*(m+2)-input-side wavelength selective switches WSS each connected to any one of the internode connection input port Pi1 to Pim and the internal connection input port Pni1, Pni2 and receiving the input wavelength division multiplexing light to select a wavelength included in the wavelength division multiplexing light, and multiple (n+2) 1*(m+2)-photocouplers PC each connected to any one of the internode connection output ports Po1 to Pon and the internal connection output ports Pno1, Pno2 and each receiving and outputting a wavelength selected by the input-side wavelength selective switches WSS to any one of the internode connection output ports Po1 to Pon and the internal connection output ports Pno1, Pno2. In this way, the number of the expensive wavelength selective switches WSS can be reduced by half as is the case with the optical cross-connect portion OXC1 shown in FIG. 3.

Third Embodiment

Figure 14:
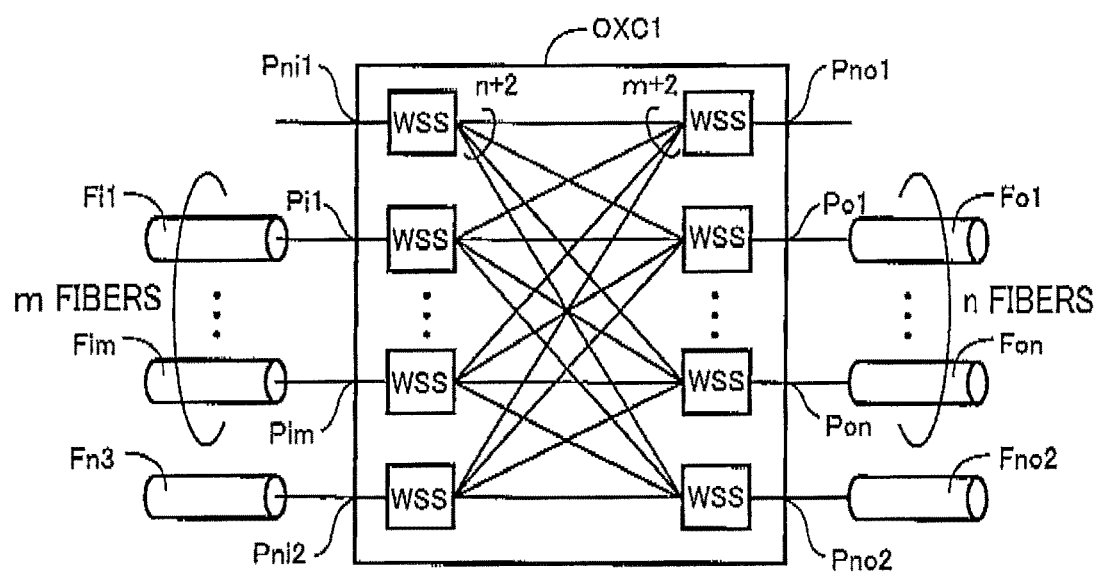
FIG. 14 is a diagram for explaining a further configuration example of the multiple optical cross-connect portions disposed on the optical cross-connect apparatus, corresponding to FIG. 3.

FIG. 14 shows a further example of the optical cross-connect portion OXC1 shown in FIG. 3. This optical cross-connect portion OXC1 of a third embodiment has multiple (m+2) 1*(m+2)-input-side wavelength selective switches WSS each connected to any one of the internode connection input port Pi1 to Pim and the internal connection input port Pni1, Pni2 and receiving the input wavelength division multiplexing light to select a wavelength included in the wavelength division multiplexing light, and multiple (n+2) 1*(n+2)-output-side wavelength selective switches WSS each connected to any one of the internode connection output ports Po1 to Pon and the internal connection output ports Pno1, Pno2 and each receiving and alternatively outputting a wavelength selected by the input-side wavelength selective switches WSS to any one of the internode connection output ports Po1 to Pon and the internal connection output ports Pno1, Pno2. In this way, because photocouplers are not employed, the optical loss is significantly reduced in the optical cross-connect portion.

Fourth Embodiment

Figure 15:
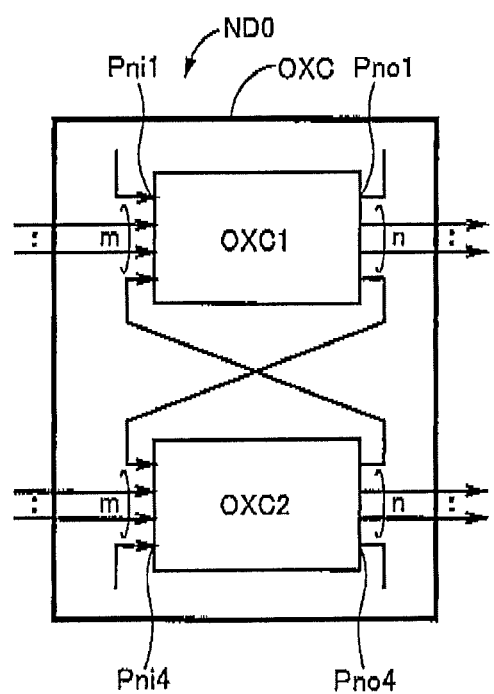
FIG. 15 is a diagram for explaining an example of the optical cross-connect apparatus made up of two of multiple optical cross-connect portions.
Figure 16:
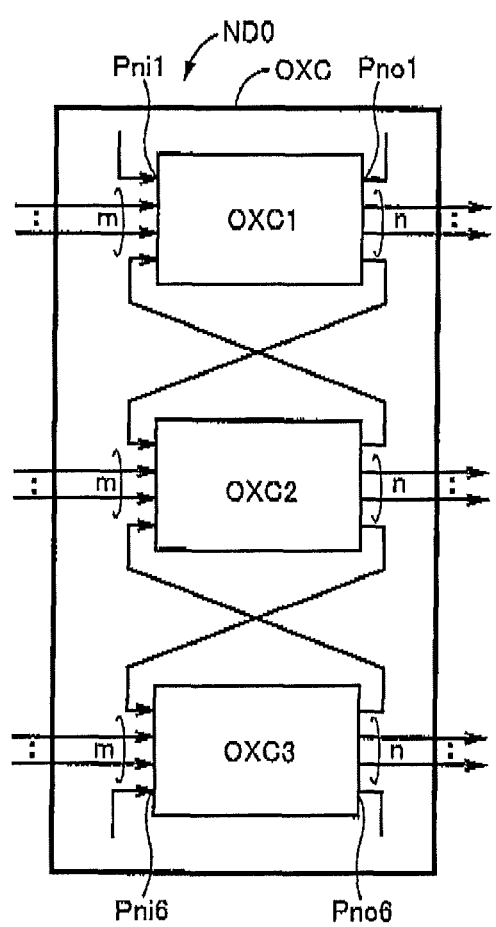
FIG. 16 is a diagram for explaining an example of the optical cross-connect apparatus made up of three of multiple optical cross-connect portions.

Although the optical cross-connect apparatus OXC of FIG. 2 is made up of the four optical cross-connect portions OXC1 to OXC4, as shown in FIG. 15, the optical cross-connect apparatus OXC can be made up of two optical cross-connect portions OXC1 and OXC2 including the same input/output ports as the embodiment of FIG. 2 and externally connected and interconnected in the same way and, as shown in FIG. 16, the optical cross-connect apparatus OXC can be made up of three optical cross-connect portions OXC1 to OXC3 including the same input/output ports as the embodiment of FIG. 2 and externally connected and interconnected in the same way. The optical cross-connect portion OXC1 shown in FIG. 15 is provided with the internal connection input port Pni1 and the internal connection output port Pno1 for expansion not connected to the other optical cross-connect portion OXC2, and the optical cross-connect portion OXC2 is provided with the internal connection input port Pni4 and the internal connection output port Pno4 for expansion not connected to the other optical cross-connect portion OXC1. The optical cross-connect portion OXC1 shown in FIG. 16 is provided with the internal connection input port Pni1 and the internal connection output port Pno1 for expansion connected to none of the other optical cross-connect portions OXC2 and OXC3, and the optical cross-connect portion OXC3 is provided with the internal connection input port Pni6 and the internal connection output port Pno6 for expansion connected to none of the other optical cross-connect portions OXC1 and OXC2. The optical cross-connect apparatuses OXC shown in FIGS. 15 and 16 can provide the same effect as the optical cross-connect apparatus OXC shown in FIG. 2 described above.

Fifth Embodiment

Figure 17:
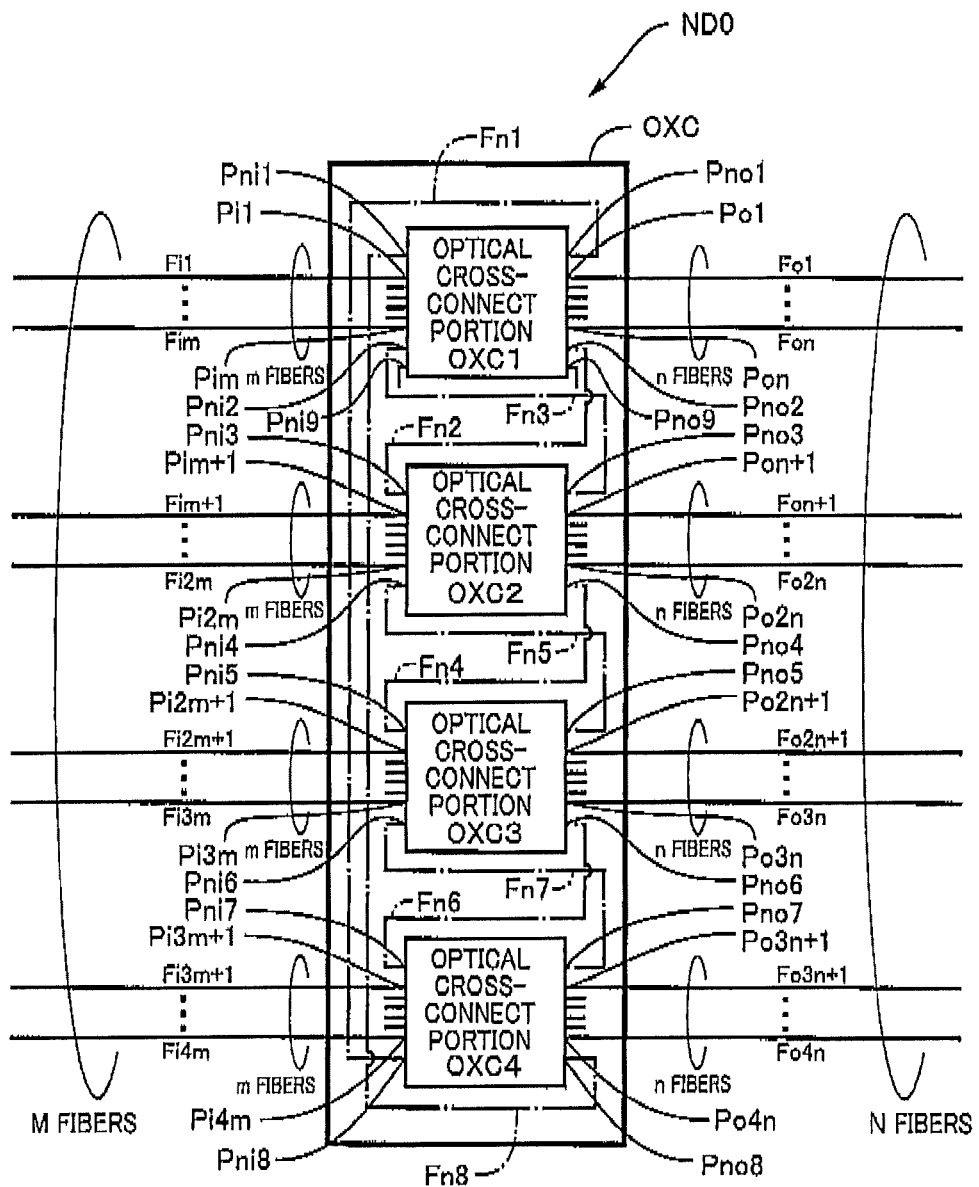
FIG. 17 is a diagram for explaining a configuration of the optical cross-connect apparatus to which another embodiment of the present invention is applied.

FIG. 17 shows another configuration example of the optical cross-connect apparatus OXC. The optical cross-connect apparatus OXC of FIG. 17 is different from the optical cross-connect apparatus OXC of FIG. 2 in that, since the internal connection output port Pno1 and the internal connection input port Pni1 of the optical cross-connect portion OXC1 are directly connected through the internal connection optical fibers Fn1 and Fn8 to the internal connection input port Pni8 and the internal connection output port Pno8 of the optical cross-connect portion OXC4, the four optical cross-connect portions OXC1 to OXC4 are arranged and connected like a ring through the internal connection optical fibers and that an internal connection input port Pni9 and an internal connection output port Pno9 for expansion are added to the optical cross-connect portion OXC1.

Figure 18:
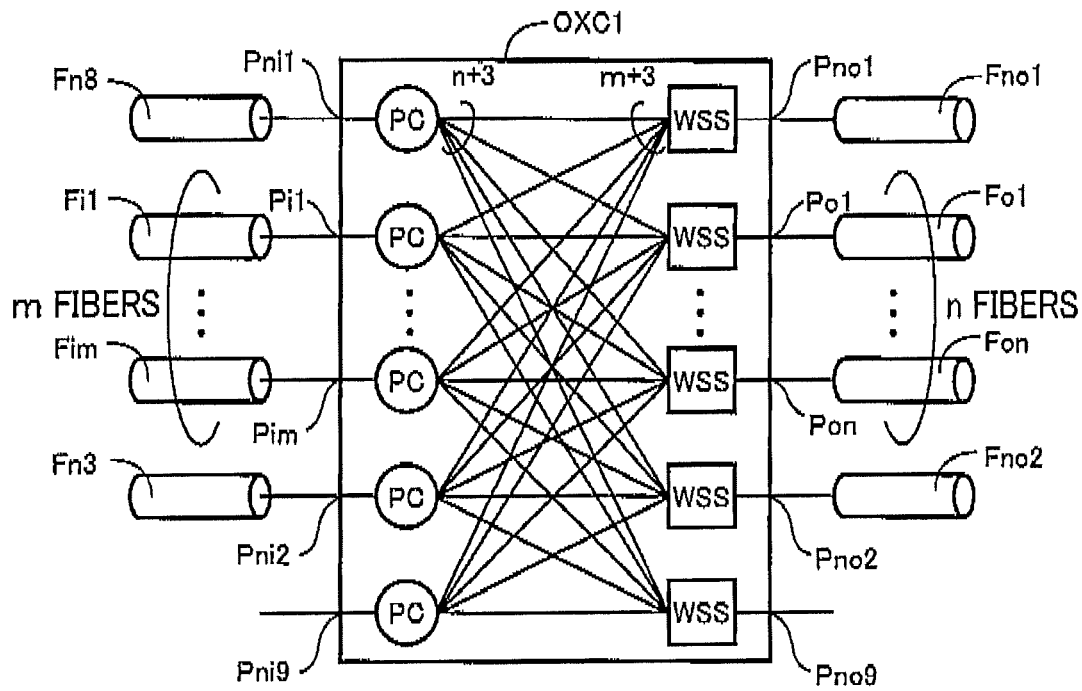
FIG. 18 is a diagram for explaining a configuration of the optical cross-connect portion used in the embodiment of FIG. 17, corresponding to FIG. 3.

FIG. 18 shows a configuration of the optical cross-connect portion OXC1 included in the optical cross-connect apparatus OXC of this embodiment. The optical cross-connect portion OXC1 of this embodiment has multiple (m+3) 1*(m+3)-input-side photocouplers PC and multiple (n+3) 1*(n+3)-output-side wavelength selective switches WSS. As compared to the optical cross-connect apparatus OXC of FIG. 2, the optical cross-connect portion OXC1 of this embodiment further includes one input-side photocoupler PC and one output-side wavelength selective switch WSS so as to include the internal connection input port Pni9 and the internal connection output port Pno9 for expansion.

Figure 19:
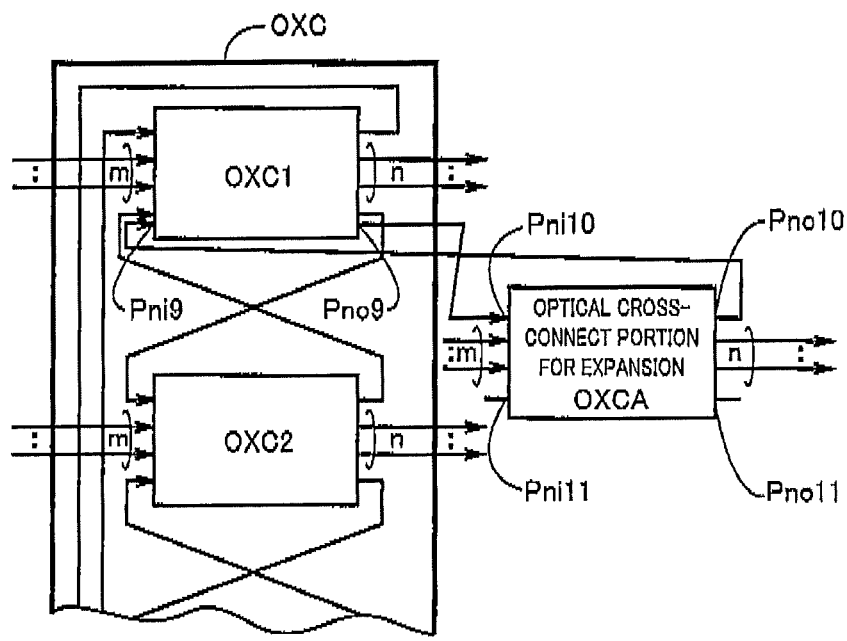
FIG. 19 is a diagram for explaining a state in which an optical cross-connect portion for expansion is connected to the optical cross-connect portion apparatus of the embodiment of FIG. 17.
Figure 20:
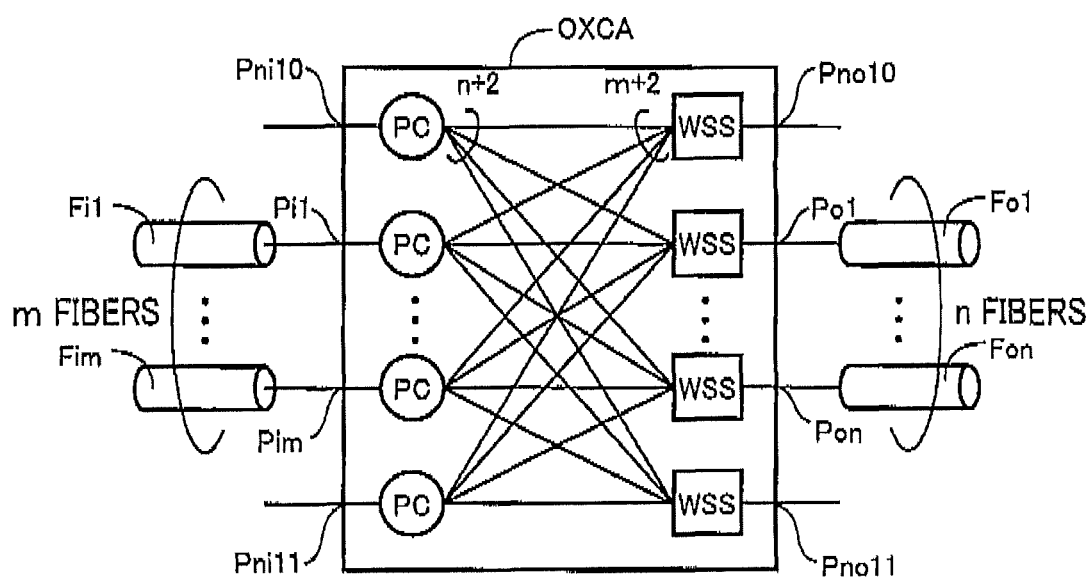
FIG. 20 is a diagram for explaining a configuration of the optical cross-connect portion for expansion of FIG. 19, corresponding to FIG. 3.

FIG. 19 shows a state in which an optical cross-connect portion for expansion (sub-system for expansion) OXCA is connected to the internal connection input port Pni9 and the internal connection output port Pno9 for expansion of the optical cross-connect portion OXC1 out of the multiple optical cross-connect portions OXC1 to OXC4 making up the optical cross-connect apparatus OXC of this embodiment. As shown in FIG. 20, the optical cross-connect portion for expansion OXCA has substantially the same basic configuration in that (m+2) 1*(m+2)-photocouplers PC and (n+2) 1*(n+2)-wavelength selective switches WSS are included as is the case with the optical cross-connect portions OXC1 to OXC4 shown in FIGS. 3, 4, and 5. However, the optical cross-connect portion for expansion OXCA includes an internal connection input port Pni10 and an internal connection output port Pno10 for expansion respectively connected to the internal connection input port Pni9 and the internal connection output port Pno9 for expansion of the optical cross-connect portion OXC1 and further includes an internal connection input port Pni11 and an internal connection output port Pno11 for two-stage expansion connected to none of the multiple optical cross-connect portions OXC1 to OXC4 included in the optical cross-connect apparatus OXC.

In the embodiment of FIG. 2, the optical cross-connect apparatus OXC is made up of the four optical cross-connect portions OXC1 to OXC4 and each of the four optical cross-connect portions OXC1 to OXC4 is connected such that an internal connection output port of a predetermined optical cross-connect portion is directly connected to an internal connection input port of another optical cross-connect portion and that the optical cross-connect portions OXC1 to OXC4 are arranged and connected like through the internal connection optical fibers. That is, the optical cross-connect portions OXC1 to OXC4 are arranged and connected like a chain through the internal connection optical fibers Fn1 to Fn8. Therefore, a wavelength output from an internal connection output port of a predetermined optical cross-connect portion can bi-directionally be transmitted to optical cross-connect portions adjacent to each other among the optical cross-connect portions connected like a chain.

According to this embodiment, the optical cross-connect portion (sub-system) for expansion OXCA added to the optical cross-connect apparatus OXC includes the internal connection input port Pni11 and the internal connection output port Pno11 for two-stage expansion connected to none of the multiple optical cross-connect portions OXC1 to OXC4 included in the optical cross-connect apparatus OXC. Therefore, by connecting the internal connection input port Pni11 and the internal connection output port Pno11 for two-stage expansion of the optical cross-connect portion for expansion OXCA with the internal connection output port Pno10 and the internal connection input port Pni10 of another optical cross-connect portion for expansion OXCA, a new optical cross-connect portion can inexpensively and easily be added sequentially in accordance with a further increase in the optical fibers connected to the optical node ND0.

Sixth Embodiment

Figure 21:
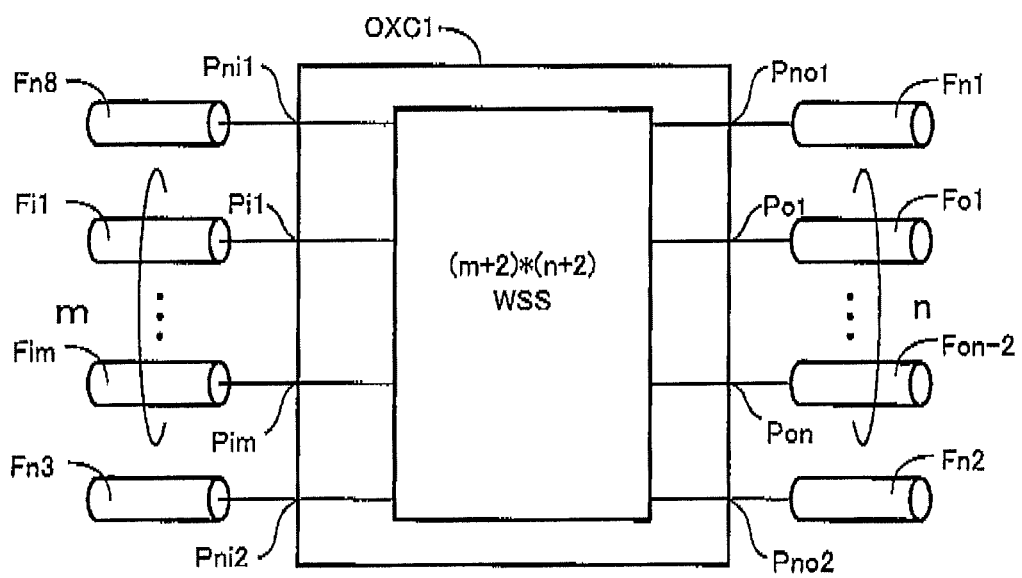
FIG. 21 is a diagram for explaining another configuration example of the multiple optical cross-connect portions disposed on the optical cross-connect apparatus of FIG. 2 or 17, corresponding to FIGS. 3, 4, and 5.

FIG. 21 is a diagram of another configuration example of the multiple optical cross-connect portions OXC1 to OXC4 making up the optical cross-connect apparatus OXC of FIG. 2 or the multiple optical cross-connect portions OXC1 to OXC4 making up the optical cross-connect apparatus OXC of FIG. 17. Since all the optical cross-connect portions OXC1 to OXC4 making up the optical cross-connect apparatus OXC of FIG. 2 are configured in the same way, the optical cross-connect portion OXC1 will be described as a representative with reference to FIG. 21. The optical cross-connect portion OXC1 of this embodiment is made up of a single (m+2)*(n+2)-wavelength selective switch WSS. This wavelength selective switch WSS is made up of for example, a three-dimensional MEMS (Micro Electro Mechanical Systems) optical switch shown in FIG. 22 or an LCOS (Liquid Crystal on Silicon) switch shown in FIG. 23.

Figure 22:
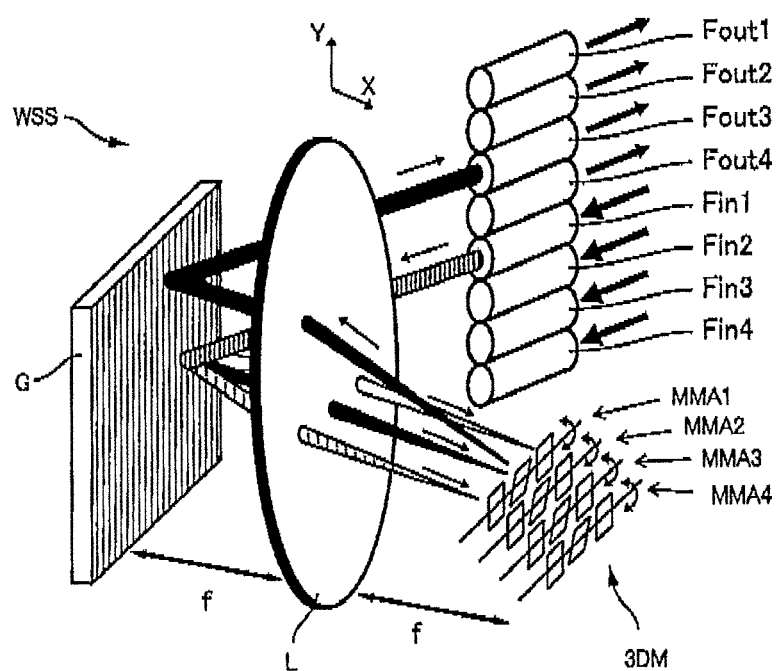
FIG. 22 is a diagram for explaining an example of a configuration of the optical cross-connect portion of FIG. 21 using three-dimensional MEMS mirrors.

The principle of the wavelength selective switch WSS of FIG. 22 is described by using, for example, a 4*4-scale three-dimensional MEMS optical switch having four optical input fibers Fin1 to Fin4 and four optical output fibers Fout1 to Fout4 having end surfaces arranged in line with each other. This three-dimensional MEMS optical switch includes a reflection type diffraction grating G that is a spectral element dispersing the wavelength division multiplexing light input from any one of the optical input fibers Fin1 to Fin4 on the basis of a wavelength; a three-dimensional MEMS mirror 3DM including micromirror arrays MMA1 to MMA4 as many as the fibers (four in FIG. 22) such that each array has k (the number of wavelengths; four in FIG. 22) micromirrors MM subjected to the position control by an actuator not shown; and a condensing lens L disposed between the diffraction grating and the MEMS mirror to condense a dispersed wavelength onto one of the micromirrors MM, and the micromirrors MM are driven such that a wavelength division multiplexing light or a wave band input from any one of the optical input fibers Fin1 to Fin4 is dispersed by the spectral grating G on the basis of a wavelength or on the basis of a wave band and is then condensed by the condensing lens L onto a predetermined one of the micromirrors MM for each wavelength and that a reflected light from the micromirrors MM is incident on a desired one of the output fibers Fout1 to Fout4, so as to provide a wavelength selective switch function. The micromirror arrays MMA1 to MMA4 are formed on a silicon substrate or a glass substrate by a well-known three-dimensional MEMS technique and are controlled in terms of amplitude by an actuator utilizing static electricity, electrostrictive force, or electromagnetic force, for example.

Figure 23:
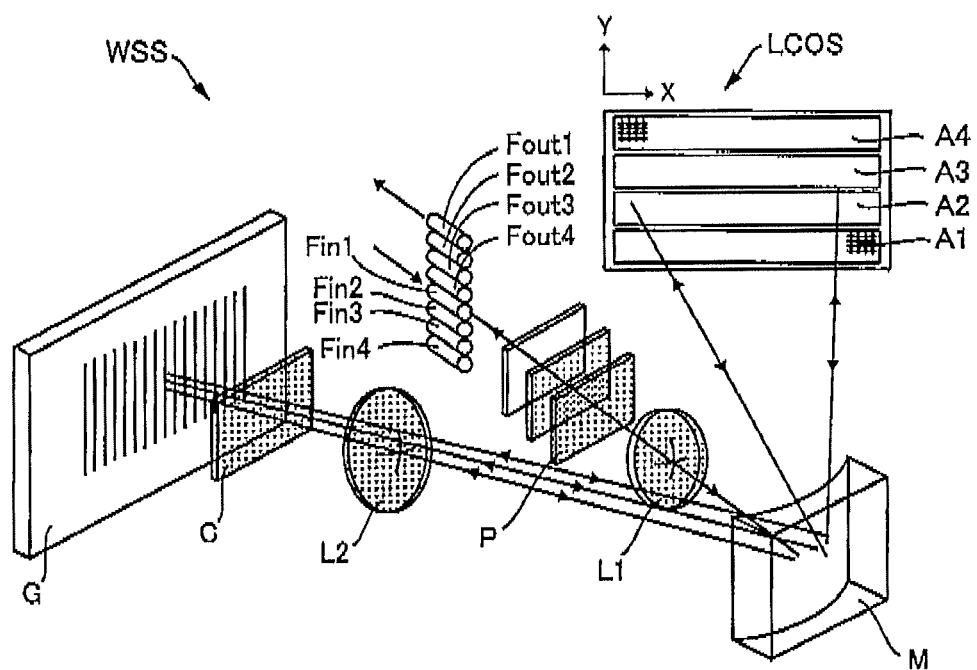
FIG. 23 is a diagram for explaining an example of a configuration of the optical cross-connect portion of FIG. 21 using LCOS.

The principle of the wavelength selective switch WSS of FIG. 23 is described by using, for example, a 4*4-scale LCOS optical switch having four optical input fibers Fin1 to Fin4 and four optical output fibers Fout1 to Fout4. This LCOS optical switch includes a reflection type diffraction grating G that is a spectral element dispersing the wavelength division multiplexing light input from any one of the optical input fibers Fin1 to Fin4 via a polarizing element P, a condensing lens L1, and a mirror M on the basis of a wavelength; and an integrated liquid crystal plate (reflective element) LCOS that has a multiplicity of pixels having parallel-oriented nematic liquid crystal layers to perform phase modulation by modulating input light in accordance with a control signal and that has pixel regions A1 to A4 as many as the fibers (four in FIG. 23) in a y-direction with k (the number of wavelengths) vertical reflection pixel groups arranged in an x-direction, and the phase modulation is performed with the pixels of the integrated liquid crystal element LCOS such that a wavelength division multiplexing light or a wave band input from any one of the optical input fibers Fin1 to Fin4 is dispersed by the spectral grating G on the basis of a wavelength or on the basis of a wave band and is then condensed through a compensation plate C by a condensing lens L2 onto a predetermined pixel group for each wavelength and that a reflected light from the integrated liquid crystal element LCOS is incident on a desired one of the output fibers Fout1 to Fout4, so as to provide a wavelength selective switch function. The integrated liquid crystal element LCOS is made up of, for example, a high-definition reflective liquid crystal panel having a structure in which liquid crystal is confined between a silicon substrate, which has a liquid crystal drive circuit and pixel electrodes, and a transparent substrate facing thereto.

According to this embodiment, since the multiple optical cross-connect portions OXC1 to OXC4 are each made up of a single (m+2)*(n+2)-wavelength selective switch WSS having multiple inputs (m+2) corresponding to the number of the internode connection input ports and the internal connection input ports as well as multiple outputs (n+2) corresponding to the number of the internode connection output ports and the internal connection output ports, the optical cross-connect portions OXC1 to OXC4 are significantly reduced in size and because the need for photocouplers is eliminated, the optical loss is significantly reduced.

According to this embodiment, the single wavelength selective switch WSS includes a fiber array having the multiple fibers Fin1 to Fin4 and Fout1 to Fout4 with end surfaces arranged in line corresponding to the number of the multiple inputs and the multiple outputs; the reflection type diffraction grating G (spectral element) receiving a wavelength division multiplexing light input from any one of the optical fibers Fin1 to Fin4 corresponding to the multiple inputs out of the multiple optical fibers Fin1 to Fin4 and Fout1 to Fout4 to disperse the wavelength division multiplexing light into each wavelength; and the three-dimensional MEMS (Micro Electro Mechanical Systems) mirror 3DM having a plurality of the micromirror arrays MMA1 to MMA4 receiving a wavelength dispersed by the spectral element and alternatively inputting the wavelength to any one of the optical fibers Fout1 to Fout4 corresponding to the multiple outputs out of the multiple optical fibers Fin1 to Fin4 and Fout1 to Fout4 through the control of the reflection direction of the wavelength. Therefore, as compared to an optical cross-connect portion made up of demultiplexers disposed for respective optical input fibers to demultiplex respective wavelength division multiplexing lights into each wavelength, 1*n-optical switches as many as the wavelengths for switching an optical path of each wavelength demultiplexed by the demultiplexers, and 1*n-multiplexers disposed for respective optical output fibers to receive and multiplex the wavelengths having paths switched by the 1*n-optical switches and output the wavelengths to the optical output fibers, the number of elements is reduced and the scale is made relatively small and, additionally, because the optical demultiplexers and the optical multiplexers are no longer used, the optical loss is significantly reduced.

According to this embodiment, the single wavelength selective switch WSS includes a fiber array having the multiple fibers Fin1 to Fin4 and Fout1 to Fout4 with end surfaces arranged in line corresponding to the number of the multiple inputs and the multiple outputs; the reflection type diffraction grating G (spectral element) receiving a wavelength division multiplexing light input from any one of the optical fibers Fin1 to Fin4 corresponding to the multiple inputs out of the multiple optical fibers Fin1 to Fin4 and Fout1 to Fout4 to disperse the wavelength division multiplexing light into each wavelength; and the integrated liquid crystal element LCOS (Liquid Crystal on Silicon) having a plurality of reflection pixels receiving a wavelength dispersed by the spectral element to alternatively input the wavelength to any one of the optical fibers Fout1 to Fout4 corresponding to the multiple outputs through the control of the reflection (diffraction) direction of the wavelength. Therefore, as compared to an optical cross-connect portion made up of demultiplexers disposed for respective optical input fibers to demultiplex respective wavelength division multiplexing lights into each wavelength, 1*n-optical switches as many as the wavelengths for switching an optical path of each wavelength demultiplexed by the demultiplexers, and 1*n-multiplexers disposed for respective optical output fibers to receive and multiplex the wavelengths having paths switched by the 1*n-optical switches and output the wavelengths to the optical output fibers, the number of elements is reduced and the scale is made relatively small and, additionally, because the optical demultiplexers and the optical multiplexers are no longer used, the optical loss is significantly reduced.

Although the embodiments of the present invention have been described with reference to the drawings, the present invention is applicable in other forms.

For example, although the optical cross-connect apparatus OXC of the embodiment described above has a pair of the internal connection input port for expansion and the internal connection output port for expansion for connecting the optical cross-connect portion for expansion (sub-system) OXCA both disposed on one optical cross-connect portion (sub-system), the ports may be disposed on respective different optical cross-connect portions (sub-systems).

Although only the optical cross-connect portion OXC1 includes a pair of the internal connection input port Pni9 and the internal connection output port Pno9 for expansion in the optical cross-connect apparatus OXC of FIG. 17, the other optical cross-connect portions OXC2 to OXC4 may also include the ports.

Although the optical cross-connect apparatus OXC of FIG. 17 is made up of the four optical cross-connect portions OXC1 to OXC4, the optical cross-connect apparatus OXC can be made up of the one optical cross-connect portion OXC1, the two optical cross-connect portions OXC1 and OXC2, or the three optical cross-connect portions OXC1 to OXC3.

Although the optical cross-connect portions OXC1 to OXC4 of the embodiment of FIG. 17 are bi-directionally interconnected as shown in FIG. 2, for example, the internal connection optical fibers Fn1, Fn3, Fn5, Fn7 or the internal connection optical fibers Fn2, Fn4, Fn6, Fn8 may be eliminated out of the internal connection optical fibers Fn1 to Fn8. Even in this case, a wavelength output from one of the optical cross-connect portions OXC1 to OXC4 can be input to any other optical cross-connect portions.

Although one fiber is used for each of the internal connection optical fibers Fn1 to Fn8, multiple fibers may be used.

Although the optical cross-connect portions OXC1 to OXC4 of the embodiments are internally connected through the internal connection optical fibers Fn1 to Fn8, the optical cross-connect portions OXC1 to OXC4 may be connected through three-dimensional waveguides etc.

Although the optical cross-connect apparatus OXC of FIG. 2 or 17 is made up of the four optical cross-connect portions OXC1 to OXC4 in the embodiments, the optical cross-connect apparatus OXC may be made up of five or more optical cross-connect portions.

Although not exemplarily illustrated one by one, the present invention may variously be modified without departing from the spirit thereof.

NOMENCLATURE OF ELEMENTS

NW: optical network
OXC: optical cross-connect apparatus
OXC1 to OXC4: optical cross-connect portion
OXCA: optical cross-connect portion for expansion
Pni1: internal connection input port of the optical cross-connect portion OXC1 (internal connection input port for expansion)
Pno1: internal connection output port of the optical cross-connect portion OXC1 (internal connection output port for expansion)
Pni8: internal connection input port of the optical cross-connect portion OXC4 (internal connection input port for expansion)
Pno8: internal connection output port of the optical cross-connect portion OXC4 (internal connection output port for expansion)
Pni9: internal connection input port of the optical cross-connect portion OXC1 (internal connection input port for expansion)
Pno9: internal connection output port of the optical cross-connect portion OXC1 (internal connection output port for expansion)
Pni10: internal connection input port of the optical cross-connect portion for expansion OXCA (internal connection input port for expansion)
Pno10: internal connection output port of the optical cross-connect portion for expansion OXCA (internal connection output port for expansion)
Pni11: internal connection input port of the optical cross-connect portion for expansion OXCA (internal connection input port for two-stage expansion)
Pno11: internal connection output port of the optical cross-connect portion for expansion OXCA (internal connection output port for two-stage expansion)
WSS: wavelength selective switches
PC: photocouplers
Fi1 to Fi4$m$: optical input fibers (internode connection optical fibers)
Fo1 to Fo4$n$: optical output fibers (internode connection optical fibers)
Fn1 to Fn8: internal connection optical fiber
Pi1 to Pi$m$, Pi$m$+1 to Pi2$m$, Pi2$m$+1 to Pi3$m$, Pi3$m$+1 to Pi4$m$: internode connection input port
Po1 to Po$n$, Po$n$+1 to Po2$n$, Po2$n$+1 to Po3$n$, Po3$n$+1 to Po4$n$: internode connection output port
Pni1 to Pni2, Pni3 to Pni4, Pni5 to Pni6, Pni7 to Pni8: internal connection input port
Pno1 to Pno2, Pno3 to Pno4, Pno5 to Pno6, Pno7 to Pno8: internal connection output port
G: spectral grating (spectral element)
MM: MEMS mirrors
L: condensing lens

The invention claimed is:

1. An optical cross-connect apparatus disposed in each of optical nodes in an optical network in which the optical nodes are each mutually connected through a plurality of internode connection optical fibers, the optical cross-connect apparatus comprising: multiple optical cross-connect portions each having internode connection input ports and internode connection output ports respectively connected to the plurality of internode connection optical fibers, as well as internal connection input ports and internal connection output ports, the multiple optical cross-connect portions each being connected such that an internal connection output port of a predetermined optical cross-connect portion is directly connected to an internal connection input port of another optical cross-connect portion and is indirectly connected via said another optical cross-connect portion to an internal connection output port of a further optical cross-connect portion, at least one optical cross-connect portion of the multiple optical cross-connect portions also having an internal connection input port for expansion and an internal connection output port for expansion, which are connected to an optical cross-connect portion for expansion and which are not connected to the other optical cross-connect portions, the optical cross-connect portion for expansion having:
internode connection input ports and internode connection output ports respectively connected to the plurality of internode connection optical fibers;
an internal connection output port and an internal connection input port respectively connected to the internal connection input port for expansion and the internal connection output port for expansion of the at least one optical cross-connect portion, and
an internal connection output port for expansion and an internal connection input port for expansion respectively connected to an internal connection input port and an internal connection output port of another optical cross-connect portion for expansion, and said another optical cross-connect portion for expansion having the same number of internode connection input ports, internode connection output ports, internal connection input ports, internal connection output ports, internal connection output ports for expansion, and internal connection input ports for expansion as said optical cross-connect portion for expansion, respectively.

2. The optical cross-connect apparatus according to claim 1, wherein in a pair of optical cross-connect portions adjacent to each other among the multiple optical cross-connect portions, an internal connection output port of one optical cross-connect portion is connected to an internal connection input port of the other optical cross-connect portion while an internal connection output port of the other optical cross-connect portion is connected to an internal connection input port of the one optical cross-connect portion.

3. The optical cross-connect apparatus according to claim 1, wherein an internal connection output port of a predetermined optical cross-connect portion of the multiple optical cross-connect portions is directly connected to an internal connection input port of another optical cross-connect portion and is indirectly connected via said another optical cross-connect portion to an internal connection input port of a further optical cross-connect portion so that the optical cross-connect portions are arranged and connected like a chain through internal connection optical fibers.

4. The optical cross-connect apparatus according to claim 1, wherein the optical cross-connect apparatus comprises at least three optical cross-connect portions and wherein each of the at least three optical cross-connect portions is connected such that an internal connection output port of a predetermined optical cross-connect portion is directly connected to an internal connection input port of another optical cross-connect portion and that the optical cross-connect portions are arranged and connected like a ring through internal connection optical fibers.

5. The optical cross-connect apparatus according to claim 1, wherein the multiple optical cross-connect portions are each made up of a wavelength selective switch including a spectral element dispersing a wavelength division multiplexing light into each wavelength and a MEMS mirror or a high-definition reflective liquid crystal panel receiving and alternatively inputting a wavelength dispersed by the spectral element to any one of multiple fibers.

6. The optical cross-connect apparatus according to claim 5, wherein the multiple optical cross-connect portions each include a plurality of photocouplers respectively connected to the internode connection input ports and the internal connection input ports and output-side wavelength selective switches respectively connected to the internode connection output ports and the internal connection output ports to receive wavelength division multiplexing lights from the photocouplers and select and alternatively output wavelengths included in the wavelength division multiplexing lights to the internode connection output ports and the internal connection output ports.

7. The optical cross-connect apparatus according to claim 5, wherein the multiple optical cross-connect portions each include a plurality of input-side wavelength selective switches respectively connected to the internode connection input ports and the internal connection input ports and receiving input wavelength division multiplexing lights to select wavelengths included in the wavelength division multiplexing lights, and photocouplers respectively connected to the internode connection output ports and the internal connection output ports and receiving and outputting the wavelengths selected by the input-side wavelength selective switches respectively to the internode connection output ports and the internal connection output ports.

8. The optical cross-connect apparatus according to claim 5, wherein the multiple optical cross-connect portions each include a plurality of input-side wavelength selective switches respectively connected to the internode connection input ports and the internal connection input ports, and output-side wavelength selective switches respectively connected to the internode connection output ports and the internal connection output ports to receive and alternatively output wavelengths selected by the input-side wavelength selective switches to the internode connection output ports and the internal connection output ports.

9. The optical cross-connect apparatus according to claim 1, wherein
the at least one optical cross-connect portion has one internal connection input port and one internal connection output port, as well as one internal connection input port for expansion and one internal connection output port for expansion, and
the optical cross-connect portion for expansion and said another optical cross-connect portion for expansion each have one internal connection input port and one internal connection output port, as well as one internal connection input port for expansion and one internal connection output port for expansion.

10. The optical cross-connect apparatus according to claim 9, wherein the optical cross-connect portion for expansion and said another optical cross-connect portion for expansion are each made up of a plurality of photocouplers and a plurality of wavelength selective switches, and have the same configuration.

11. The optical cross-connect apparatus according to claim 10, wherein
the at least one optical cross-connect portion is made up of a plurality of photocouplers and a plurality of wavelength selective switches, and
the optical cross-connect portion for expansion and said another optical cross-connect portion for expansion are each made up of the plurality of photocouplers of which the number is one larger than the number of the plurality of photocouplers of the at least one optical cross connect portion, as well as the plurality of wavelength selective switches of which the number is one larger than the number of the plurality of wavelength selective switches of the at least one optical cross-connect portion.

12. The optical cross-connect apparatus according to claim 10, wherein
the at least one optical cross-connect portion is made up of a plurality of wavelength selective switches, and
the optical cross-connect portion for expansion and said another optical cross-connect portion for expansion are each made up of the plurality of wavelength selective switches of which the number is two larger than the number of the plurality of wavelength selective switches of the at least one optical cross-connect portion.

* * * * *